United States Patent Office 3,555,035
Patented Jan. 12, 1971

3,555,035
N-(SUBSTITUTED PYRIDYL) LINOLAMIDES AND -LINOLENAMIDES
Alex Meisels, Basel, and Emilio Schott, Riehen, Switzerland, assignors to Geigy Chemical Corporation, Greenburgh, N.Y., a corporation of Delaware
No Drawing. Continuation of application Ser. No. 610,804, Jan. 23, 1967, which is a continuation-in-part of application Ser. No. 474,107, July 22, 1965. This application June 9, 1969, Ser. No. 834,596
Claims priority, application Switzerland, Jan. 28, 1966, 1,234/66, 1,236/66, 1,238/66
Int. Cl. C07d 31/44
U.S. Cl. 260—295                 12 Claims

ABSTRACT OF THE DISCLOSURE

Pyridylamides of the formula

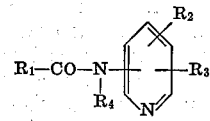

wherein:

$R_1$—CO— represents the acyl radical of an alkanoic, alkenoic or alkapolyenoic acid, which radical has from 6 to 22 carbon atoms,
$R_2$ represents halogen, lower alkyl, lower alkoxy, lower alkenyloxy, lower alkylthio, lower alkenylthio, hydroxy-lower alkyl, lower alkanoyloxy-lower alkyl, oxo-lower alkyl, lower alkanoyl, hydroxyl, mercapto, sulpho, sulphamyl, cyano, amino, lower alkyl-substituted amino, lower alkanoylamino, chloro-anilino, lower alkoxycarbonyl, carbamoyl or lower alkyl-substituted carbamoyl,
$R_3$ represents hydrogen, halogen or lower alkyl, and
$R_4$ represents hydrogen or lower alkyl, and their addition salts with inorganic and organic acids, and urea adducts of certain of the above pyridylamides which compounds have valuable pharmacological properties, in particular antiviral and tumour inhibiting activity with remarkably favourable relationship between the significantly active and the maximal tolerated dosages; compositions containing the above-defined compounds as active substances in combination with pharmaceutically acceptable carriers; and methods of treating viral afflictions and of inhibiting tumours with the aid of the aforesaid compounds and compositions. Analogous compounds in which $R_2$ is replaced by nitro, as intermediates.

CROSS-REFERENCE

This application is a continuation of our application Ser. No. 610,804, filed Jan. 23, 1967, which in turn is a continuation-in-part of our application 474,107 filed July 22, 1965, both now abandoned.

SPECIFICATION

This invention relates to new amides of aliphatic carboxylic acids, novel pharmaceutical compositions containing them and the use of such novel compounds and compositions for certain therapeutical purposes.

More particularly, the invention provides for new pyridyl-amides of the formula

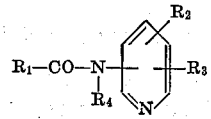

(I)

wherein:

$R_1$—CO— represents the acyl radical of an alkanoic, acid, alkenoic acid or of alkapolyenoic acid, which radical has from 6 to 22 carbon atoms,
$R_2$ represents halogen, lower alkyl, lower alkoxy, lower alkenyloxy, lower alkylthio, lower alkenylthio, hydroxy-lower alkyl, lower alkanoyloxy-lower alkyl, oxo-lower alkyl, lower alkanoyl, hydroxyl, mercapto, sulpho, sulphamyl, cyano, amino, lower alkyl-substituted amino, lower alkanoylamino, chloro-anilino, lower alkoxycarbonyl, carbamoyl or lower alkyl-substituted carbamoyl,
$R_3$ represents hydrogen, halogen or lower alkyl, and
$R_4$ represents hydrogen or lower alkyl, and the pharmaceutically acceptable acid addition salts of compounds of Formula I, especially those of the pyridyl radical of which contains a salt-forming group such as amino, lower alkylamino or lower dialkylamino as substituent $R_2$, with inorganic or organic acids,
as well as the urea adducts, usually in a weight ratio of compound of Formula I to urea of about 1:3, of those compounds of Formula I in which $R_1$—CO— represents the acyl radical of a fatty acid of from 18 to 20 carbon atoms and containing at least 2 and at most 4 non-cumulated C—C double bonds,
all of which compounds possess valuable pharmacological properties, especially antiviral and tumour growth-inhibiting activities with a remarkably favourable ratio between the significantly active and the maximal tolerated dosages.

A first subclass of compounds of the invention comprises the amides of the formula

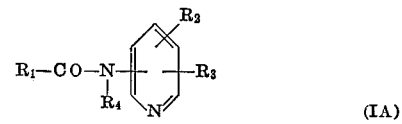

(IA)

wherein:

$R_1$—CO— represents the acyl radical of a fatty acid of from 18 to 20 carbon atoms and containing at least 2 and at most 4 non-cumulated C—C double bonds,
$R_2$ represents halogen, lower alkyl, lower alkoxy, lower alkenyloxy, lower alkylthio, lower alkenylthio, hydroxy-lower alkyl, lower alkanoyloxy-lower alkyl, oxo-lower alkyl, hydroxyl, mercapto, sulpho, sulphamyl, cyano, amino, lower alkyl-substituted amino, lower alkanoylamino, chloroanilino, lower alkoxycarbonyl, carbamyl or lower alkyl-substituted carbamyl, and
$R_3$ and $R_4$ have the same meaning as in Formula I, their pharmaceutically acceptable salts and their urea adducts as defined above.

As antiviral agents, especially, in the treatment of infections with herpes simplex virus or in cases of Asiatic influenza and the like infections caused by influenza virus A, there are useful those compounds falling under Formula IA in which the pyridyl ring bears the above listed substituents $R_2$ and $R_3$, with the exception of those in which $R_2$ is lower alkyl and $R_3$ is hydrogen.

Compounds of the formula:

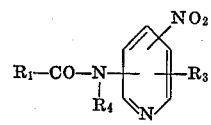

wherein $R_1$ has the same meaning as in Formula IA and $R_3$ and $R_4$ have the same meanings as in Formula I are useful as intermediates for the corresponding amino-pyridyl derivatives, but have shown no activity, e.g. on Ehrlich carcinoma or on herpes simplex virus. Influenza A PR8 virus, Columbia SK virus or Louping ill virus.

Known pyridylamides of fatty acids having no substituents $R_2$ or $R_3$ in the pyridine nucleus have been used e.g. in photographic emulsions, but we have not found them to possess any antiviral or tumour growth-inhibiting activity.

Antiviral activity of the compounds pertaining to this first subclass was determined e.g. in the mouse on subcutaneous and oral administration on herpes simplex virus, influenza A virus and the vaccine virus. The tumour growth inhibiting activity of the compounds falling under Formula IA, including those in which $R_2$ is lower alkyl and $R_3$ is hydrogen, was determined in animal tests on subcutaneous and oral administration in cases of transplanted Ehrlich carcinoma, sarcoma induced by methylcholanthrene (MC sarcoma) and of skin carcinoma induced by dimethylbenzanthracene (DMBA carcinoma) in the mouse. These tests were performed using five animals per dosage and ten as controls. The active ingredients were administered in the case of Ehrlich carcinoma on four, and in cases of induced tumors on eight consecutive days in dosages which were at most 1/4 or 1/8, respectively, of the Dosis tolerata maxima (Dtm) and the size of the Ehrlich tumors was determined on the sixth and that of the induced tumors on the first day after conclusion of the test by measuring the cross section.

The tumor growth-inhibiting effect E of compounds of Formula IA was determined by comparing the reduced diameter of the tumors in the test animals with those in the controls.

This tumor growth-inhibiting activity of compounds of Formula I, according to the invention, was also compared with that of the unsubstituted parent substance, N-(2-pyridyl)-linolamide [described by F. Zetzsche, in Berichte 71, pp. 1516–1521 (1938)].

The unexpectedly superior, significant activity of the new compounds can be clearly seen from the following table in which the aforesaid parent substance is compared with N-(5-methyl-2-pyridyl)-linolamide, as a characteristic representative of the new amides of Formula IA:

wherein:

$R_1$—CO represents the acyl radical of an alkanoic acid, alkenoic acid or of alkapolyenoic acid, which radical has from 6 to 14 carbon atoms.

$R_2$ represents a halogen atom, a lower alkyl, alkoxy, alkenyloxy, alkylthio, alkenylthio, alkanoyl, alkanoylamino or alkoxycarbonyl group, or the carbamoyl group, and $R_4$ represents hydrogen or a lower alkyl radical, and their addition salts with inorganic and organic acids, as well as urea products thereof, but as especially well tolerated compounds those falling under Formula IB in which $R_2$ represents halogen, lower alkyl, lower alkoxy, lower alkenyloxy, lower alkylthio, lower alkenylthio, lower alkanoylamino or lower alkoxycarbonyl, and their pharmaceutically acceptable salts with an acid.

The antiviral activity was determined, e.g. in the mouse on subcutaneous and oral administration against herpes simplex virus, influenza A virus, particularly influenza A PR8 virus, and influenza B-Lee virus, Columbia SK virus and louping ill virus (virus of sheep encephalitis) and the tumor inhibiting action could be determined in pharmacological tests, on subcutaneous and oral administration to the mouse against transplanted Ehrlich carcinoma, induced methyl cholanthrene sarcoma, dimethyl benzanthracene carcinoma of the skin and spontaneous tumors, and on subcutaneous and oral administration to the rat against transplanted Yoshida sarcoma and induced dimethyl benzanthracene mammary carcinoma. The tests on animals characterise the compounds of this subclass as suitable for the treatment of virus diseases such as herpes simplex, herpes zoster, influenza, encephalitis and others as well as for the treatment of neoplasia.

In these compounds of Formula IB, $R_1$—CO— is, e.g. the acyl radical of a straight chain alkanoic acid such as hexanoic acid, the acyl radical of a straight chain alkenoic or alkapolyenoic acid such as 2-octenoic acid or 2,4,6,8-decatetraenoic acid, or the acyl radical of a branched chain alkanoic acid such as 2-ethyl-butyric acid, or the acyl radical of a branched chain alkenoic acid or alkapolyenoic acid such as 3-methyl-2-nonenoic acid or 2-allyl-4-pentenoic acid.

The substituent $R_2$ is, e.g. chlorine, fluorine, bromine,

TABLE

|  | Type of tumor | Dosage, mg./kg. | Effect E, percent |
|---|---|---|---|
| Test substance: |  |  |  |
| N-(5-methyl-2-pyridyl)-linolamide | Ehrlich carcinoma | 4 x 1,250 s.c. | 25 |
|  |  | 4 x 625 s.c. | 25 |
|  |  | 4 x 312.5 s.c. | 25 |
|  |  | 4 x 1,250 p.o. | 25 |
|  |  | 4 x 625 p.o. | ¹15 |
| (Dtm>5 g./kg.) | MC sarcoma | 8 x 625 s.c. | 50–75 |
|  |  | 8 x 625 s.c. | 75 |
|  | DMBA carcinoma | 8 x 312.5 s.c. | 50 |
|  |  | 8 x 312.5 p.o. | 75–99 |
| N-(2-pyridyl)-linolamide | Ehrlich carcinoma | 4 x 1,250 s.c. | 0 |
|  |  | 4 x 1,250 p.o. | 0 |
| (Dtm>5 g./kg.) | MC sarcoma | 8 x 625 s.c. | 25 |
|  |  | 8 x 625 p.o. | ¹15 |
|  | DMBA carcinoma | 8 x 625 s.c. | ¹15 |
|  |  | 8 x 625 p.o. | 0 |

¹About.

In the case of Ehrlich carcinoma, the statistical limit value above which the growth-inhibiting effect is significant is at 10%, while in the case of MC Sarcoma and DMBA carcinoma, that limit value is at about 25%.

A second subclass of compounds of the invention comprises the amides of general formula

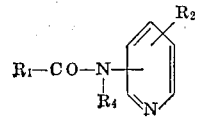

(IB)

iodine, a methyl, ethyl, n-propyl, isopropyl, n-butyl, isobutyl, tert.butyl, methoxy, ethoxy, n-propoxy, isopropoxy, n-butoxy, isobutoxy, n-hexoxy, allyloxy, 1-methyl-allyloxy, 2-methyl-allyloxy, methylthio, ethylthio, isopropylthio, n-butylthio, allylthio, formamido, acetamido, methoxycarbonyl, ethoxycarbonyl, N-propoxycarbonyl, isopropoxycarbonyl, N-butoxycarbonyl, isobutoxycarbonyl, or tert.butoxycarbonyl group.

Lower alkyl radicals $R_4$ are exemplified by those listed for $R_2$.

In the non-preferred compounds of Formula IB, $R_2$ can also be formyl, acetyl, propionyl, butyryl, valeryl or carbamoyl.

A third subclass of compounds according to the invention comprises amides of the formula

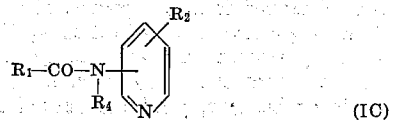

(IC)

wherein:

R₁—CO— represents the acryl radical of an alkanoic acid or alkenoic acid which acyl radical has from 15 to 22 carbon atoms, R₂ represents a halogen atom, a lower alkyl, alkoxy, alkenyloxy, alkylthio, alkenylthio, alkanoyl, alkanoylamino or alkoxycarbonyl group or the carbamoyl, and R₄ represents hydrogen or a lower alkyl radical, and their addition salts with inorganic and organic acids as well as their urea adducts, but as especially well tolerated compounds those falling under Formula IC in which R₂ represents halogen, lower alkyl, lower alkoxy, lower alkenyloxy, lower alkylthio, lower alkenylthio, lower alkanoylamino or lower alkoxycarbonyl.

Their antiviral activity could be determined, e.g. in the mouse on subcutaneous and oral administration against Herpes simplex virus, influenza-A virus, Columbia SK virus and Loupingill virus (encephalitis virus in sheep); the tumour inhibiting action could be determined in pharmacological tests on subcutaneous and oral administration to the mouse against transplanted Ehrlich carcinoma, induced methyl cholanthrene sarcoma, dimethyl benzanthracene carcinoma of the skin and spontaneous tumors and by the same administration to the rat against transplanted Yoshida sarcoma and induced dimethyl benzanthracene mammary carcinoma. The animal tests characterise the compounds of general Formula IC as suitable for the treatment of virus diseases such as Herpes simplex, Herpes zoster, influenza, encephalitis and others as well as for the treatment of neoplasia.

In the compounds of this third subclass R₁—CO— is, for example, the acyl radical of palmitic acid, stearic acid, behenic acid, oleic acid, elaidic acid, erucic acid or brassidic acid.

The substituent R₂ is, e.g. chlorine, fluorine, bromine, iodine, a methyl, ethyl, n-propyl, isopropyl, n-butyl, isobutyl, tert-butyl, methoxy, ethoxy, n-propoxy, isopropoxy, n-butoxy, isobutoxy, n-hexoxy, allyloxy, 1-methyl-allyloxy, 2-methyl-allyloxy, methylthio, ethylthio, isopropylthio, n-butylthio, allylthio, formamido, acetamido, methoxycarbonyl, ethoxycarbonyl, n-propoxycarbonyl, isopropoxycarbonyl, n-butoxycarbonyl, isobutoxycarbonyl, tert. butoxycarbonyl group.

Lower alkyl radicals R₄ are exemplified by those listed for R₂.

In the non-preferred compounds of Formula IC, R₂ can also be formyl, acetyl, propionyl, butyryl, valeryl or carbamoyl.

The new amides of Formula I are produced by reacting an acid of the formula

R₁—CO—OH    (II)

wherein R₁—CO— has the meaning given above, or a reactive functional derivative of such acid with a nuclear substituted aminopyridine or nuclear substituted alkylaminopyridine of the formula

(III)

wherein R₂, R₃ and R₄ have the meanings given above, or with a reactive functional derivative thereof. To perform this process, for example, an acid of the general Formula II is reacted with a compound of the general Formula III; this is done in the presence of a carbodiimide such as dicyclohexyl carbodiimide, in an inert solvent such as tetrahydrofuran. Low alkyl esters, e.g. the methyl or ethyl ester, of acids of the general Formula II and also the amides yield the correspondingly substituted amides of general Formula I on heating with compounds of general Formula III.

Other suitable reactive functional derivatives of acids of the general Formula II are the halides and anhydrides, in particular the mixed anhydrides with carbonic acid semiesters. These functional derivatives are reacted with a compound of the general Formula III preferably in the presence of an acid binding agent, e.g. a strong tertiary organic base such as triethylamine, pyridine or s-collidine, which, in excess, can also serve as reaction medium, or the reaction is performed in the presence of an excess of the reaction component of general Formula III in the presence or absence of an inert organic solvent such as benzene, tetrahydrofuran or dimethyl formamide.

Examples of acids of Formula II are hexanoic acid, heptanoic acid, octanoic acid, nonanoic acid, decanoic acid, undecanoic acid, dodecanoic acid, tridecanoic acid or tetradecanoic acid, pentadecanoic acid, palmitic acid, heptadecanoic acid, stearic acid, nonadecanoic acid, eicosanic acid, (arachidic acid), heneicosanic acid, docosanoic acid (behenic acid), 2-methyl-tetradecanoic acid, 2-ethyl-tetradecanoic acid, 2-methyl-hexadecanoic acid, 2-(n-butyl)-tetradecanoic acid, 2-(n-pentyl)- tetradecanoic acid, 2-ethyl-octadecanoic acid, 2-methyl eicosanic acid, 2-ethyl butyric acid, 3,3-dimethyl-butyric acid, 2-ethyl pentanoic acid, 2-ethyl-4-methyl-pentanoic acid, 2-ethyl hexanoic acid, 2,2-diethyl butyric acid, 3,3,5-trimethyl hexanoic acid, 3,5,5-trimethyl hexanoic acid, 2-n-butyl hexanoic acid, 2-ethyl decanoic acid, 2-ethyl dodecanoic acid, sorbic acid, 2-octenoic acid, 2-nonenoic acid, 2-decenoic acid, 2-undecanoic acid, 10-undecenoic acid, 2-dodecenoic acid, 2-tridecenoic acid, 2-tetradecenoic acid, 2,4,6,8-decatetraenoic acid, hexadecenoic acids such as cis-9-hexadecenoic acid (palmitoleic acid), heptadecenoic acids such as cis-9-heptadecenoic acid, octadecenoic acids such as oleic acid, elaidic acid, cis-6-, -8-, -10-, and -11-octa-decenoic acid, 9-nonadecenoic acid, eicosanic acids, heneicosanic acids, docosenoic acids such as cis-13-docosenoic acid (erucic acid) and trans-13-docosenoic acid (brassidic acid), linoleic acid, α-linolenic acid, 7,9-octadecandienoic acid, arachidonic acid, 2-allyl - 4-pentenoic acid, 3 - ethyl - 2-hexenoic acid, 2-(1-methyl-allyl)-pentenoic acid, 3 - methyl-2-nonenoic acid, 3 - methyl-2-undecenoic acid, 3-methyl-2-tridecenoic acid, 2-alkyl-dodecanoic acid, 2-allyl - tridecanoic acid, 2-allyl-tetradecanoic acid and 2-(n-heptyl)-12-tridecenoic acid.

Examples of alkylaminopyridines of Formula III are 2-amino-5-chloro-pyridine,
3-amino-6-fluoro-pyridine,
2-amino-5-iodo-pyridine,
2-amino-3,5-dibromo-pyridine,
3-amino-6-chloropyridine,
3-amino-6-methyl-pyridine,
3-amino-6-acetylamino-pyridine,
2-amino-5-methyl-pyridine,
2-amino-4,6-dimethyl-pyridine,
2-amino-5-ethyl-pyridine,
2-amino-5-n-propyl-pyridine,
2-amino-5-n-butyl-pyridine,
2-amino-5-isobutyl-pyridine,
3-amino-6-methoxy-pyridine,
3-amino-6-butoxy-pyridine,
3-amino-6-hexoxy-pyridine,
3-amino-6-allyloxy-pyridine,
3-amino-6-methallyloxy-pyridine,
3-amino-6-methylmercapto-pyridine,
3-amino-6-ethylmercapto-pyridine,
3-amino-6-allylmercapto-pyridine,
2-amino-5-acetoxymethyl-pyridine,
2-amino-5-(α-acetoxy-ethyl)-pyridine, 2-amino-5-formyl-pyridine,
2-amino-5-acetyl-pyridine,
2-amino-5-butyryl-pyridine,
2-amino-5-valeryl-pyridine,
2-amino-5-acetonyl-pyridine,
2-amino-6-hydroxy-pyridine,
2-amino-6-mercapto-pyridine,
2-amino-5-sulfonyl-pyridine,
2-amino-5-sulfamyl-pyridine,
2-amino-5-nitro-pyridine,
2-amino-5-cyano-pyridine,
2,5-diamino-pyridine,
5-amino-2-methylamino-pyridine,
5-amino-2-isopropylamino-pyridine,
5-amino-2-ethylamino-pyridine,
5-amino-2-butylamino-pyridine,
5-amino-2-dimethylamino-pyridine,
2-amino-5-diethylamino-pyridine,
2-amino-5-formylamino-pyridine,
2-amino-5-methoxycarbonyl-pyridine,
2-amino-5-ethoxycarbonyl-pyridine,
2-amino-5-carbamyl-pyridine,
2-amino-5-(N-methylcarbamyl)-pyridine,
2-amino-5-(N-ethylcarbamyl)-pyridine,
2-amino-5-(N,N-dimethyl-carbamyl)-pyridine,
2-amino-5-(N,N-diethylcarbamyl)-pyridine,
2-amino-5-(4'-chloroanilino)-pyridine,
2-amino-5-(2',4'-dichloro-anilino)-pyridine,
2-amino-(3',4'-dichloroanilino)-pyridine,
2-amino-5-isopropyl-pyridine,
2-amino-5-t-butyl-pyridine,
3-amino-6-ethoxy-pyridine,
3-amino-6-isobutoxy-pyridine and
3-amino-6-propionyl-pyridine.

The reaction of acid halides with suitable tertiary organic bases, particularly triethylamine, in an inert organic solvent, filtration of the hydrohalide formed and reaction of the ketene or ketene dimer present in the solution with the desired compound of general Formula III is mentioned as a modification of the reaction of acid halides with compounds of the general Formula III in the presence of acid binding agents.

Activated esters of acids of general Formula II are, e.g. their p-nitrophenyl ester and cyanomethyl ester, which can be reacted with compounds of general Formula III in inert organic solvents, if necessary while heating. The 1-imidazolides of the acids mentioned are reacted under similar conditions with compounds of general Formula III.

The isocyanates and isothiocyanates derived from compounds of the general Formula III having a hydrogen atom as $R_4$ are mentioned as reactive functional derivatives of compounds of general Formula III which can be reacted direct with acids of the general Formula II. These are heated with the acids of general Formula II until the equimolar amount of carbon dioxide or carbon oxysulphide has been liberated.

The reactions with isocyanates and isothiocyanates can be performed in the presence or absence of an inert organic solvent having a sufficiently high boiling point or range. Instead of isocyanates, also precursors thereof can be used, i.e. in particular the azides of pyridine carboxylic acids substituted corresponding to the definition of $R_2$ and $R_3$ can be reacted with acids of general Formula II while heating in suitable inert organic solvents. In addition for example, N-chloro carbonyl derivatives of compounds of general Formula III, in particular of those compounds of general Formula III having a low alkyl radical $R_4$, are reacted with salts, e.g. alkali metal salts, of acids of general Formula II in the presence or absence of inert organic solvents and the reaction mixtures are heated until the equimolar amount of carbon dioxide has been liberated from the carboxylic acid-carbamic acid an hydrides primarily formed. Also, sulphurous acid monoalkyl ester amides and phosphorous acid-o-phenylene diester amides can be derived from compounds of the general Formula III having a low alkyl radical as $R_4$. These ester amides, on being reacted with acids of general Formula II in organic solvents such as pyridine, dioxan or dimethyl formamide or benzene, yield the desired amides of general Formula I.

Other reactive functional derivatives of compounds of the general Formula III are, for example, the N-trimethylsilyl derivatives, among others, e.g. ethyltrimethylsilyl aminopyridine carboxylates ($R_2$=$COOC_2H_5$) which can be obtained by reacting these amines with trimethylsilyl chloride in inert, anhydrous, organic solvents. These N-trimethylsilyl derivatives can be reacted with reactive functional derivatives of acids of the general Formula II in inert solvents to form N-trimethylsilyl derivatives of amides of general Formula I, from which the desired amides are formed by decomposing with water or low alkanols.

Another type of reactive derivatives of compounds of general Formula III are the N,N'-dipyridyl carbodiimides substituted in the two pyridine rings corresponding to the definition of $R_2$. These can be obtained, e.g. by heating the corresponding, substituted N,N'-dipyridyl thioureas with lead-(II) oxide in anhydrous toluene while gradually distilling off the solvent. On heating the carbodiimides mentioned with acids of general Formula II in a stream of carbon dioxide at temperatures of about 200° C., the desired amides of general Formula I are formed.

Instead of alkenoic or alkapolyenoic acids having 6–22 carbon atoms embraced by general Formula II or instead of reactive functional derivatives thereof, if desired, the saturated bromine addition products of those acids or reactive functional derivatives thereof can be reacted with nuclear substituted amino-pyridines or nuclear substituted alkylamino pyridines of general Formula III or with reactive derivatives thereof and the amides of poly-bromine fatty acids immediately obtained which have 6–22 carbon atoms can be debrominated.

The reactive functional derivatives of both reaction components and also the reaction conditions for the amide formation, are substantially those given for the direct production of compounds of general Formula I. The debromination is performed, for example, by boiling the intermediate products with zinc in ethanol. This two step process for the production of compounds of general Formula I appears to be more complicated than the single step process first mentioned. It can be of advantage, however, if amides of those unsaturated acids are to be produced which are difficult to purify, e.g. wherein it is difficult to separate isomers and/or homologues. In such cases, an optional purification, e.g. crystallisation, can be performed in the step of the bromine addition products of the acids or if the substituted pyridylamides of poly-bromo-alkanoic acids obtained with such bromine addition products can be better purified, e.g. recrystallised, than the end substances containing no bromine in the acyl radical. When the latter is the case, then bromine can be added to an unsaturated amide of the general Formula I obtained by the first process mentioned—which can also be regarded as a purifying operation—the addition product can be purified by crystallisation or by another usual process and, finally, debrominated.

As the bromine addition products of acids of Formula IA are often produced, e.g. in the case of linoleic acid and linolenic acid, during their isolation from natural mixtures of fatty acids and, after purification, again have to be debrominated, the above modification of the process starting from crude acid mixtures necessitates no extra steps in the reaction but is only a change in the order of the steps in this case.

If desired, compounds of Formula I produced by one of the processes given above, are converted into other compounds of this formula. In particular, compounds analogous to Formula I containing a nitro group as radical $R_2$ are reduced, if desired, into corresponding compounds having an amino group as radical $R_2$. The same is also true of the corresponding, substituted polybromine fatty acid amides, i.e. the conversion of the nitro group into the amino groups can also be introduced between the amide formation and the debromination in the second process mentioned. The nitro group is reduced to the amino group, for example, by means of hydrogen in the presence of a noble metal catalyst such as, e.g. palladium on calcium carbonate, at room temperature and normal pressure in an organic solvent such as ethanol. The reduction is interrupted after about three times the molar amount of hydrogen has been taken up.

Also, if desired, compounds of Formula I or the polybromine fatty acid amides occurring in the second process mentioned as intermediates which contain, as substituent, an oxo-lower-alkyl radical such as a lower alkanoyl radical ($\alpha$-oxo-alkyl radical), $\beta$-oxo-alkyl radical or $\gamma$-oxo-alkyl radical as radical $R_2$, are reduced to corresponding compounds containing a hydroxy-lower-alkyl radical as radical $R_2$. The reduction of compounds of Formula I as defined is performed, e.g. by means of sodium or potassium boronhydride in an organic solvent such as methanol, ethanol, dioxan or tetrahydrofuran. The reduction of the polybromine fatty acid amides substituted by an oxoalkyl radical in the pyridine ring can be performed, e.g. by catalytic methods analogously to the reduction of a nitro group, until the equimolar amount of hydrogen has been taken up.

If desired the amides of Formula I containing a lower hydroxyalkyl group or an amino group as radical $R_2$, or the corresponding, substituted polybromine fatty acid amides can be acylated to the corresponding amides containing a lower alkanoyloxyalkyl or alkanoylamino group.

Amides of the general Formula I wherein $R_2$ is a low alkanoylamino group can also be produced by reacting amides of the general Formula IV,

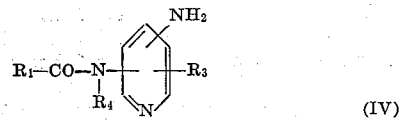

(IV)

wherein $R_1$—CO—, $R_3$ and $R_4$ have the meanings given in Formula I, with a compound introducing a low alkanoyl radical. The alkanoylation, e.g. acetylation, is performed by known methods, e.g. by reacting with a low alkanoic acid halide or anhydride at room temperature or moderately raised temperatures. If necessary, the reaction is performed in the presence of an acid binding agent such as pyridine, which is simultaneously the reaction medium, or in the presence of an alkali carbonate in an inert organic solvent or in the presence of sodium hydroxide solution in a two-phase, organic aqueous system.

Starting materials of the general Formula IV can be obtained, for example, by reduction of corresponding nitropyridyl amides. These can be produced in their turn, e.g. by acylating amino-nitro-pyridines analogously to the process first mentioned for production of compounds of general Formula I. If a protecting group which is usual in peptide synthesis is first introduced into the amino-nitro-pyridines mentioned, then the nitro group is reduced, the acyl radical $R_1$—CO— is introduced analogously to the first process mentioned for the production of compounds of general Formula I and then the protection group is split off, then starting materials of the general Formula IV in which the amide group and amino group have changed places are obtained from the same amino-nitro-pyridines.

The acetyl radical as $R_2$ substituent in the pyridyl nucleus of precursors to the compounds of Formula I is introduced in place of a hydroxyl group, for example, by boiling a primary reaction product having a free hydroxyl group in excess acetanhydride. The amides to be acylated of Formula I containing a lower hydroxyalkyl group as radical $R_2$ are obtained in their turn, for example, by the reduction of amides of Formula I which, in the corresponding position, contain a lower oxoalkyl group as substituent. The same is true of the corresponding polybromine fatty acid amides. Amides of unsaturated fatty acids as well as of corresponding polybromine fatty acids which contain the hydroxyl group as radical $R_2$, are obtained, for example, by direct N-acylation of the corresponding pyridine derivatives of Formula III with acids of Formula II or their reactive functional derivatives or with the corresponding polybromine fatty acids or their analogous derivatives.

The present invention further concerns a process for the production of pyridyl-amides of general formula

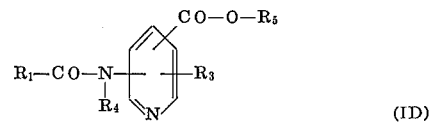

(ID)

wherein:

$R_1$—CO—, $R_3$ and $R_4$ have the same meanings as in Formula I, and $A_5$ represents a lower alkyl group,
and novel intermediates therefor.

Compounds of the general Formula ID are produced by esterification of novel intermediates of the formula

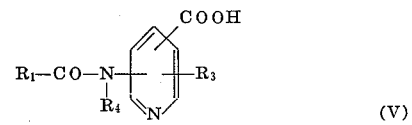

(V)

wherein $R_1$, $R_3$ and $R_4$ have the meanings given in Formula I, by conventional methods.

This esterification is performed, e.g. by reacting with diazo alkanes, particularly diazomethane, or with low alkanols in the presence of a carbodiimide, particularly dicyclohexyl carbodiimide. Also, the compounds of general Formula ID can first be reacted with carbonyl-1,1'-diimidazole to form the corresponding N-[(1-imidazole-carbonyl)-pyridyl]-amides and the latter can be reacted with low alkanols. In addition, on treating the compounds of general Formula ID with oxalyl chloride in the cold, corresponding N - (chlorocarbonylpyridyl)-amides are obtained which can also be reacted with low alkanols to form the coresponding N-(alkoxycarbonylpyridyl)-amides.

Starting materials of the general Formula V are produced by reacting a novel intermediate of the formula

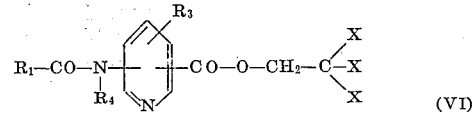

(VI)

wherein X represents a halogen atom and $R_1$—CO—, $R_3$ and $R_4$ have the meanings given in Formula I, with zinc in a liquid, optionally aqueous, organic acid. For example, the compound of general Formula VI is dissolved in acetic or formic acid having a low water content, zinc dust is added and the suspension is stirred at room temperature or at a moderately elevated temperature, preferably under an atmosphere of nitrogen.

In the starting material of general Formula VI, X is preferably chlorine but it can also be, e.g. bromine or fluorine. The starting materials are produced in their turn starting from aminopyridine carboxylic acids or low alkylaminopyridine carboxylic acids such as the known 6-amino-picolinic acid, 2-amino-isonicotinic acid and 3-amino-isonicotinic acid. These acids are esterified in the usual way, e.g. in the presence of concentrated sulphuric acid, with 2,2,2-trihalogen ethanols, particularly with 2,2,2-trichlorethanol. The radical $R_1$—CO— can also be introduced by the usual methods into the aminopyridine carboxylic acid trihalogen ethyl esters or low alkylaminopyridine carboxylic acid trihalogen ethyl esters so obtained. For example, the intermediate products mentioned are reacted with the chlorides or bromides of corresponding alkanoic acids, alkenoic acids or alkapolyene acids, in pyridine at temperatures between about 0° C. and 50° C.

Compounds of general Formula I are converted into the urea adducts aready mentioned, e.g. by adding a solution of urea in methanol to a compound of general Formula I and isolating the adduct precipitated.

The conversion of compounds of general Formula I into the acid addition salts which have already been mentioned above can be performed in the usual way. Acids suitable for salt formation are: hydrochloric acid, hydrobromic acid, sulphuric acid, phosphoric acid, methane sulphonic acid, ethane disulphonic acid, β-hydroxyethane sulphonic acid, acetic acid, lactic acid, oxalic acid, succinic acid, fumaric acid, maleic acid, malic acid, tartaric acid, citric acid, benzoic acid, salicylic acid, phenylacetic acid and mandelic acid.

Suitable daily dosages of amides of general Formula IB and their salts for the treatment of virus diseases and neoplasia lie between about 2 to 100 mg. per kg. of body weight and, within this range, generally the dosage on parenteral administration is lower than that on oral administration. The daily dosages mentioned are administered advantageously in dosage units of 50 to 500 mg. of active substance but also corresponding amounts of forms for administration not made up into single dosages can be administered, e.g. syrups, sprays, aerosols, powders and ointments.

Dosage units for oral administration preferably contain between 10% and 90% of an amide general Formula I or a pharmaceutically acceptable salt thereof as active ingredient. They are produced by mixing the active substance with, e.g., solid, pulverulent carriers such as lactose, saccharose, sorbitol, mannitol; starches such as potato starch, maize starch or amylopectin, also laminaria powder or citrus pulp powder; cellulose derivatives or gelatine, optionally with the addition of lubricants such as magnesium or calcium stearate or polyethylene glycols of suitable molecular weights, and the mixture is pressed into tablets or dragée (sugar coated tablet) cores. The latter are coated, e.g. with concentrated sugar solutions which can also contain, e.g. gum arabic, talcum and/or titanium dioxide, or with a lacquer dissolved in easily volatile solvents or mixtures of solvents. Dyestuffs can be added to these coatings, e.g. to distinguish between different dosages of active ingredient.

Examples of dosage units for rectal administration are suppositories which consist of a combination of an amide of general Formula I or a suitable, pharmaceutically acceptable salt thereof with a neutral fatty foundation, or also gelatine rectal capsules which contain a combination of the active substance or a suitable salt thereof with polyethylene glycols (Carbowax) of suitable molecular weight.

Ampoules for parenteral, particularly intravenous, intramuscular or subcutaneous administration contain a water soluble, pharmaceutically acceptable salt of an amide of general Formula I in a concentration of, preferably, 0.5–10%, in aqueous solution, optionally together with suitable stabilising agents and buffer substances.

Other forms for administration, particularly for the treatment of virus infections of the respiratory tract, are syrups and also aerosols and, for local treatment of virus diseases, ointments and powders. All these forms for administration can be prepared by using the carriers, diluents and additives usual for this purpose.

Examples for the production of tablets, dragées and capsules are given below:

(a) 250 g. of active substance, e.g. N-(5-methyl-2-pyridyl)-dodecanamide, are mixed with 175.80 g. of lactose and 169.70 g. of potato starch, the mixture is moistened with an alcoholic solution of 10 g. of stearic acid and granulated through a sieve. After drying, 160 g. of potato starch, 200 g. of talcum, 2.50 g. of magnesium stearate and 32 g. of colloidal silicon dioxide are mixed in and the mixture is pressed into 10,000 tablets each weighing 100 mg. and containing 25 mg. of active substance. The tablets can be grooved if desired for better adaptation of the dosage.

(b) A granulate is produced from 250 g. of active substance, e.g. N-(5-methyl-2-pyridyl)-sorbamide, 175.90 g. of lactose and the alcoholic solution of 10 g. of stearic acid. After drying, the granulate is mixed with 56.60 g. of colloidal silicon dioxide, 165 g. of talcum, 20 g. of potato starch and 2.50 g. of magnesium stearate and the mixture is pressed into 10,000 dragée cores. These are then coated with a concentrated syrup made from 502.28 g. of crystallised saccharose, 200 g. of talcum, 6 g. of shellac, 10 g. of gum arabic, 0.22 g. of dyestuff and 1.5 g. of titanium dioxide and dried. The dragée obtained each weigh 140 mg. and contain 25 mg. of active substance.

(c) Similar tablets and dragée are obtained by replacing the active substance used above by the same amounts of N-(5-chloro-2-pyridyl)-oleamide.

(d) 500 g. of N-(5-methyl-2-pyridyl)-linolamide are mixed intimately with 190 g. of liquid paraffin (Nujol) and 150 mg. of butyl-hydroxyanisol as antioxidant. The mixture is then used as filling for 1,000 soft-gelatin capsules, of 11 minim each, on a Scherer capsulating machine.

The following examples illustrate the production of the new compounds of general Formula I but they in no way limit the scope of the invention. The temperatures are given in degrees centigrade.

EXAMPLE 1

7.6 (0.05 mol) of 5 - amino - 2 - propoxy-pyridine are dissolved in 20 ml. of pyridine. While stirring and cooling with ice water, 10.15 g. (0.05 mol) of 10-undecenoyl chloride are added dropwise within 10 minutes and the mixture is stirred for another 2 hours at room temperature. The reaction mixture is then poured into 200 ml. of ice water, extracted three times with 100 ml. of chloroform and the chloroform solutions are washed neutral with water. The combined chloroform solutions are dried with sodium sulphate and evaporated to dryness. The residue is recrystallised from benzene/petroleum ether whereupon N-(6-propoxy-3-pyridyl)-10-undecenamide is obtained, M.P. 64°.

To prepare the hydrochloride, the above amide is dissolved in a little methanol, an excess of ethereal hydrochloric acid is added and the precipitated hydrochloride is filtered off. After recrystallisation from methanol/ether, it melts at 159°.

The following compounds, e.g. are produced in an analogous way:

(a) N-(5-bromo-2-pyridyl)-10-undecenamide, M.P. 75°
(b) N-(5-chloro-2-pyridyl)-10-undecenamide, M.P. 67°
(c) N-(5-methyl-2-pyridyl)-10-undecenamide, M.P. 67°
(d) N-(6-allylthio-3-pyridyl)-10-undecenamide hydrochloride, M.P. 153°.

EXAMPLE 2

7.0 g. (0.0404 mol) of 2-amino-5-bromopyridine are dissolved in 50 ml. of pyridine 8.21 g. (0.0404 mol) of 10-undecenoyl chloride are added dropwise within 10 minutes while stirring and cooling with ice water and the mixture is stirred for another 2 hours at room temperature. The reaction mixture is poured into 250 ml. of ice water and the precipitated N-(5-bromo - 2 - pyridyl)-10-undecenamide is recrystallised from methanol, M.P. 74°.

The following compounds, for example, are produced analogously:

(a) N-(5-iodo-2-pyridyl)-10-undecenamide, M.P. 84°
(b) N-(6-ethoxy-3-pyridyl)-10-undecenamide, M.P. 67°

(c) N-(6-butoxy-3-pyridyl)-10-undecenamide, M.P. 62°
(d) N-(6-allyloxy-3-pyridyl)-10-undecenamide, M.P. 62°
(e) N-(6-ethylthio-3-pyridyl)-10-undecenamide, M.P. 64°
(f) N-(5-ethoxycarbonyl-2-pyridyl)-10-undecenamide, M.P. 74°
(g) N-(6-acetamido-3-pyridyl)-10-undecenamide, M.P. 152°
(h) N-(6-propoxy-3-pyridyl)-octanamide, M.P. 78°
(i) N-(6-propoxy-3-pyridyl)-nonanamide, M.P. 65°
(j) N-(6-propoxy-3-pyridyl)-decanamide, M.P. 70°
(k) N-(6-propoxy-3-pyridyl)-undecanamide, M.P. 77°
(l) N-(5-chloro-2-pyridyl)-dodecanamide, M.P. 91°
(m) N-(4-methyl-2-pyridyl)-dodecanamide, M.P. 52°
(n) N-(5-methyl-2-pyridyl)-dodecanamide, M.P. 79°
(o) N-(6-propoxy-3-pyridyl)-dodecanamide, M.P. 83°
(p) N-(6-propoxy-3-pyridyl)-tridecanamide, M.P. 84°
(q) N-(6-propoxy-3-pyridyl)-tetradecanamide, M.P. 85°
(r) N-(5-ethoxycarbonyl-2-pyridyl)-tetradecanamide, M.P. 79°
(s) N-(6-propoxy-3-pyridyl)-2-noneamide, MP. 84°
(t) N-(5-bromo-2-pyridyl)-sorbamide, M.P. 154°
(u) N-(5-methyl-2-pyridyl)-sorbamide, M.P. 151°
(v) N-(5-methyl-2-pyridyl)-2-allyl-3-methyl-4-pentanamide hydrochloride, M.P. 121°
(w) N-(6-acetylamino-3-pyridyl)-sorbamide, M.P. 238°
(x) N-(6-allyloxy-3-pyridyl)-undecanamide, M.P. 68°
(y) N-(5-ethoxycarbonyl-2-pyridyl)-sorbamide, M.P. 162°
(z) N-(5-ethoxycarbonyl-2-pyridyl)-3,5,5-trimethyl-hexanamide, M.P. 82°
(aa) N-(6-acetylamino-3-pyridyl)-3-ethyl-2-hexanamide, M.P. 162°
(bb) N-(5-chloro-2-pyridyl)-3-ethyl-2-hexenamide hydrochloride, M.P. 136°
(cc) N-(5-methyl-2-pyridyl)-2-ethyl-hexanamide $n_D^{22°}$: 1.5185
(dd) N-(6-acetylamino-3-pyridyl)-tridecanamide, M.P. 162°
(ee) N-methyl-N-(5-methyl-2-pyridyl)-10-undecenamide $n_D^{21°}$: 1.5095
(ff) N-(4-methyl-2-pyridyl)-sorbamide, M.P. 210°
(gg) N-(4-methyl-2-pyridyl)-3,5,5-trimethyl-hexanamide, M.P. 53°
(hh) N-(4-methyl-2-pyridyl)-10-undecenamide, M.P. 38°.

EXAMPLE 3

7.6 g. (0.05 mol) of 5-amino-2-propoxy-pyridine are dissolved in 20 ml. of chloroform. While stirring and cooling with ice water, 5.48 g. (0.025 mol) of dodecanoyl chloride are added dropwise within 10 minutes and the mixture is stirred for another 2 hours at room temperature. The reaction mixture is poured into 200 ml. of ice water and extracted three times with 100 ml. of chloroform. The combined chloroform solutions are washed neutral with water, dried with sodium sulphate and concentrated to dryness. The residue is recrystallised from methanol, whereupon N-(6-propoxy-3-pyridyl)-dodecanamide is obtained, M.P. 83°.

EXAMPLE 4

3.69 g. (0.02 mol) of 10-undecenoic acid and 2.02 g. (0.02 mol) of triethylamine are dissolved in 100 ml. of tetrahydrofuran and the solution is cooled to −15°. While stirring well, 2.15 g. (0.02 mol) of ethyl chloroformate dissolved in 20 ml. of tetrahydrofuran, are added dropwise, during which addition the temperature should not rise above −10°. After stirring for 15 minutes at −10°, a solution of 3.08 g. (0.02 mol) of 6-aminonicotinic acid ethyl ester in 20 ml. of tetrahydrofuran is added at −18° to −12° to the solution formed of the mixed anhydride of 10-undecenoic acid and carbonic acid monoethyl ester. The mixture is stirred for 1 hour at −10° and, after removal of the cooling, for another 12 hours at room temperature. The precipitated triethylamine hydrochloride is filtered off under suction, the filtrate is evaporated and the N-(5-ethoxycarbonyl-2-pyridyl)-10-undecenamide is recrystallised from methanol, M.P. 74°.

EXAMPLE 5

1.84 g. (0.01 mol) of 10-undecenoic acid and 2.79 g. (0.01 mol) of 2-amino-5-bromopyridine are dissolved in 50 ml. of tetrahydrofuran. A solution of 2.08 g. (0.01 mol) of N,N′-dicyclohexyl carbodiimide in 50 ml. of tetrahydrofuran is added dropwise while stirring at −10°. After stirring for 1 hour at −10° and for 4 hours at room temperature, the precipitated N,N′-dicyclohexyl urea is filtered off under suction and washed with tetrahydrofuran. The filtrate is concentrated and the N-(5-bromo-2-pyridyl)-10-undecenamide is recrystallised from methanol, M.P. 74°.

EXAMPLE 6

2.14 g. (0.01 mol) of 10-undecenoic acid ethyl ester and 1.08 g. (0.01 mol) of 6-amino-3-picoline are heated under a stream of nitrogen and while stirring well for 4 hours at 230°. After cooling, the crude N-(5-methyl-2-pyridyl)-10-undecenamide is recrystallised from methanol, M.P. 66.5°.

EXAMPLE 7

A solution of 2.08 g. (0.01 mol) of N,N′-dicyclohexyl carbodiimide in 50 ml. tetrahydrofuran is added dropwise at −10° to a stirred solution of 1.84 g. (0.01 mol) of 10-undecenoic acid and 1.4 g. (0.01 mol) of p-nitrophenol in 50 ml. of tetrahydrofuran. After stirring for 1 hour at −10° and for 4 hours at room temperature, the precipitated N,N′-dicyclohexyl urea is filtered off under suction and washed with tetrahydrofuran and the filtrate is concentrated. 3.06 g. (0.01 mol) of the 10-undecenoic acid-p-nitrophenyl ester which remains as residue are left to stand for 4 days with 10.8 g. (0.1 mol) of 6-amino-3-picoline in 50 ml. of chloroform. After evaporating off the solvent, the crude product is purified by chromatography through a column. The product is identical with the N-(5-methyl-2-pyridyl)-10-undecenamide produced according to Example 6.

EXAMPLE 8

2.22 g. (0.022 mol) of triethylamine are dissolved in 50 ml. of anhydrous ether. While stirring and cooling with ice water, 2 g. (0.01 mol) of 10-undecenoyl chloride dissolved in 20 ml. of anhydrous ether are added dropwise within 5 minutes. Then 1.73 g. (0.01 mol) of 2-amino-5-bromopyridine dissolved in 50 ml. of ethyl acetate are added dropwise within 10 minutes and the mixture is stirred for another 2 hours.

The precipitated triethylamine hydrochloride is filtered off under suction and washed with ethyl acetate. On working up the filtrate analogously to Example 1, N-(5-bromo-2-pyridyl)-10-undecenamide is obtained, M.P. 74°.

EXAMPLE 9

2.22 g. (0.01 mol) of 2-amino-5-iodopyridine are dissolved in 30 ml. of dimethyl formamide and 1.01 g. (0.01 mol) of triethylamine. While stirring and cooling with ice water, 1.86 g. (0.01 mol) of trimethyl silyl chloride dissolved in 10 ml. of dimethyl formamide are added dropwise within 10 minutes and the mixture is stirred for another 2 hours at room temperature. While stirring and cooling with ice water, 1.11 g. (0.011 mol) of triethylamine and then 2.0 g. (0.01 mol) of 10-undecenoyl chloride, dissolved in 10 ml. of dimethyl formamide, are added dropwise to the solution obtained of 2-trimethyl silylamino-5-iodopyridine, whereupon the mixture is stirred for another 2 hours. The reaction mixture is poured into 300 ml. of ice water, the precipitated product is filtered off under suction, dried under high vacuum (4 hours at 40°) and recrystallised from methanol. The N-(5-iodo-2-pyridyl)-10-undecenamide obtained melts at 84° (cf. Example 2).

EXAMPLE 10

1.62 g. (0.01 mol) of 1,1'-carbonyl diimidazole are added at room temperature to 1.84 g. (0.01 mol) of 10-undecenoic acid dissolved in 25 ml. of anhydrous tetrahydrofuran. On completion of the development of carbon dioxide, 1.56 g. (0.01 mol) of 3-amino-6-ethylthiopyridine dissolved in 20 ml. of anhydrous tetrahydrofuran are added to the solution obtained of 1-(10-undecenoyl)-imidazole and the reaction mixture is refluxed for 10 minutes. The residue obtained after evaporating off the tetrahydrofuran is taken up in 50 ml. of ether and extracted three times with 50 ml. of water. The ethereal solution is concentrated and the N-(6-ethylthio-3-pyridyl)-10-undecenamide is recrystallised from methanol M.P. 64°.

EXAMPLE 11

3.71 g. (0.01 mol) of N-(6-amino-3-pyridyl)-10-undecenoic acid amide in 20 ml. of pyridine and 10 ml. of acetanhydride are left to stand for 12 hours at room temperature. The reaction mixture is poured onto 150 g. of ice and the crystals of N-(6-acetylamino-3-pyridyl)-10-undecenamide which precipitate are filtered off under suction and recrystallised from methanol, M.P. 152° (cf. Example 2 (g)).

EXAMPLE 12

(a) 1.52 g. (0.01 mol) of 6-amino-3-propoxy-pyridine and 1.1 g. (0.011 mol) of triethylamine are dissolved in 50 ml. of chloroform. While stirring and cooling with ice water, 3.63 g. (0.01 mol) of 10,11-dibromoundecanoyl chloride dissolved in 35 ml of chloroform are added dropwise within 10 minutes and the mixture is stirred for another 2 hours at room temperature. The chloroform solution is washed with water 3 times, evaporated to dryness and the N-(6-propoxy-3-pyridyl)-10,11-dibromoundecanamide is recrystallised from methanol, M.P. 83°.

(b) 4.78 g. (0.01 mol) of N-(6-propoxy-3-pyridyl)-10,11-dibromo-undecanamide are dissolved in 5 ml. of abs. ethanol, 5 g. of activated zinc dust are added under an atmosphere of nitrogen and the mixture is refluxed for 1 hour. After cooling, the zinc is removed by filtration, the solution is evaporated to dryness and the N-(6-propoxy-3-pyridyl)-10-undecanamide which remains is recrystallised from methonol, M.P. 64°.

EXAMPLE 13

(a) 2.75 g. (0.01 mol) of N-(5-amino-2-pyridyl)-10-undecenamide are left to stand for 12 hours at room temperature in 5 ml. of pyridine and 5 ml. of acetanhydride. The reaction product is poured onto 100 g. of ice and the crystals of N-(5-acetylamino-2-pyridyl)-10-undecenamide formed are filtered off under suction and recrystallised from methanol, M.P. 149°.

(b) N-(5-amino-2-pyridyl)-10-undecenamide can be produced as follows:

5.56 g. (0.04 mol) of 2-amino-5-nitropyridine are dissolved in 30 ml. of pyridine. While stirring and cooling (ice water), 8.12 g. (0.04 mol) of 10-undecenoyl chloride are added dropwise and the mixture is stirred for 6 hours at room temperature. The reaction mixture is poured onto ice and the crystals of N-(5-nitro-2-pyridyl)-10-undecenamide which are formed are recrystallised from methanol, M.P. 74°.

3.05 g. (0.01 mol) of N-(5-nitro-2-pyridyl)-10-undecenamide are dissolved in a mixture of 30 ml. of water, 6 ml. of dioxane and 6 ml. of methanol. 10 g. of iron powder are added and the mixture is stirred for 30 minutes at 90–93° under an atmosphere of nitrogen. The reaction mixture is then filtered while hot and the filtrate is evaporated to dryness. The N-(5-amino-2-pyridyl)-10-undecenamide is recrystallised from methanol, M.P. 82°.

EXAMPLE 14

2.57 g. (0.02 mol) of 2-amino-5-chloropyridine and 2.22 g. (0.022 mol) of triethylamine are dissolved in 100 ml. of benzene. 6 g (0.02 mol) of oleoyl chloride dissolved in 30 ml. of benzene are added dropwise within 10 minutes while stirring and cooling with ice water, and the mixture is stirred for another 2 hours at room temperature. The precipitated triethylamine hydrochloride is filtered off under suction and washed with hot benzene. After adding a stabiliser [0.5 per mil dodecyl gallate, 0.5 per mil (D,L)-α-tocopherol], the filtrate is concentrated and the crude product (7.8 g.) is dissolved in low boiling petroleum ether (40–60°) and chromatographed on a column of 300 g. of aluminium oxide (Grade III), according to Brockmann). The fractions eluted with petroleum ether (40–60°), petroleum ether/benzene and benzene are tested by thin layer chromatography (according to Stahl, Silicagel G, solvent: acetone/hexane 1:4, development: phosphorus molybdic acid 20% in alcohol, $R_f$ value of N-(5-chloro-2-pyridyl)-oleamide: 0.7).

The fractions containing pure N-(5-chloro-2-pyridyl)-oleamide are purified and concentrated, M.P. 43°.

Fractions which contain the product with impurities are purified, concentrated and again chromatographed (Alox III, 150 g.). As described above, the fractions containing pure N-(5-chloro-2-pyridyl)-oleamide are identified, combined and concentrated. The purification by chromatography may be replaced by recrystallisation from methanol.

The following compounds, for example, are produced analogously:

(a) N(5-methyl-2-pyridyl)-oleamide, M.P. 18°
(b) N-(4-methyl-2-pyridyl)-oleamide, $n_D^{25°}$: 1.5155
(c) N-(5-bromo-2-pyridyl)-oleamide, M.P. 48°
(d) N-(5-iodo-2-pyridyl)-oleamide, M.P. 57°

The compound last mentioned is converted into the hydrochloride by dissolving 0.48 g. (0.001 mol) of N-(5-iodo-2-pyridyl)-oleamide in 10 ml. of methanol and adding 12 ml. of 1 N ethereal hydrochloric acid solution. The reaction mixture is evaporated to dryness and the N-(5-iodo - 2 - pyridyl)oleamide hydrochloride is recrystallised from methanol, M.P. 145°.

(e) N-(5-chloro-2-pyridyl)-N-methyl-oleamide, $n_D^{25°}$: 1.5099
(f) N-(5-methoxycarbonyl-2-pyridyl)-oleamide, M.P. 67°
(g) N-(6-allyloxy-3-pyridyl)-oleamide, M.P. 51°
(h) N-(6-acetamido-3-pyridyl)-oleamide, M.P. 132°
(i) N-(6-propoxy-3-pyridyl)-oleamide, M.P. 44°
(j) N-(6-allylthio-3-pyridyl)-oleamide, M.P. 37°
(k) N(6-butylthio-3-pyridyl)-oleamide, M.P. 32°

EXAMPLE 15

7.7 g. (0.05 mol) of 6-acetamido-3-aminopyridine are dissolved in 20 ml. of pyridine. 13.7 g. (0.05 mol) of hexadecanoyl chloride dissolved in 40 ml. of ethyl acetate are added dropwise within 10 minutes while stirring and cooling with ice water and the mixture is stirred for another 2 hours at room temperature. The reaction mixture is poured into 200 ml. of ice water and extracted three times with 100 ml. of ethyl acetate each time. The combined ethyl acetate solutions are washed neutral with water, dried with sodium sulphate and evaporated to dryness. The residue is recrystallised from methanol whereupon N-(6-acetamido-3-pyridyl)-hexadecanamide is obtained, M.P. 162°.

The following compounds, for example, are produced in an analogous way:

(a) N-(6-acetamido-3-pyridyl)-octadecanamide, M.P. 161°
(b) N-(6-acetamido-3-pyridyl)-docosanamide, M.P. 153°
(c) N-(5-methyl-2-pyridyl)-octadecanamide, M.P. 74°
(d) N-(5-methyl-2-pyridyl)-eicosanamide, M.P. 84°
(e) N-(5-chloro-2-pyridyl)-hexadecanamide, M.P. 94°
(f) N-(5-chloro-2-pyridyl)-octadecanamide, M.P. 94° hydrochloride, M.P. 158° (produced analogously to last paragraph of example 14)
(g) N-(5-ethoxycarbonyl-2-pyridyl)-octadecanamide
(h) N-(5-methyl-2-pyridyl)-2-butyl-tetradecanamide, M.P. 76°
(i) N-(6-propxy-2-pyridyl)-octadecanamide, M.P. 87°
(j) N-methyl-N-(5-methyl-2-pyridyl)-octadecanamide, M.P. 57°
(k) N-(4-methyl-2-pyridyl)-stearamide, M.P. 62°
(l) N-(5-methyl-2-pyridyl)-hexadecanamide, M.P. 78°

EXAMPLE 16

10.8 g. (0.1 mol) of 6-amino-3-picoline are dissolved in 50 ml. of ethyl acetate. While stirring and cooling with ice water, 15.1 g. (0.05 mol) of octadecanoyl chloride dissolved in 20 ml. of ethyl acetate are added dropwise within 10 minutes and the mixture is stirred for another 2 hours at room temperature. The reaction mixture is worked up analogously to Example 2 and the reaction product is recrystallised. The N-(5-methyl-2-pyridyl)- octadecanamide obtained melts at 74°.

EXAMPLE 17

8.4 g. (0.03 mol) of oleic acid and 3.03 g. (0.03 mol) of triethylamine are dissolved in 100 ml. of tetrahydrofuran and the solution is cooled to —15°. While stirring, 3.23 g. (0.03 mol) of ethyl chloroformate dissolved in 20 ml. of tetrahydrofuran are added dropwise, during which addition the temperature should not rise above —10°. After stirring for 15 minutes at —10°, a solution of 3.24 g. (0.03 mol) of 6-amino-3-picoline in 20 ml. of tetrahydrofuran is added at —8° to —12° to the solution obtained of the mixed anhydride of oleic acid and carbonic acid monoethyl ester. The mixture is stirred for 1 hour at —10° and, after removal of the cooling, for another 12 hours at room temperature. The precipitated trimethylamine hydrochloride is filtered off under suction and washed with hot benzene. The crude product is purified by chromatography on a column analogously to Example 14. The N-(5-methyl-2-pyridyl)-oleamide melts at 18°.

EXAMPLE 18

11.2 g. (0.04 mol) of oleic acid and 4.32 g. (0.04 mol) of 2-amino-4-picoline are dissolved in 100 ml. of tetrahydrofuran. A solution of 8.24 g. (0.04 mol) of N,N'-dicyclohexyl carbodiimide in 50 ml. of tetrahydrofuran are added dropwise at —10° while stirring. After stirring for 1 hour at —10° and 4 hours at room temperature, the precipitated N,N'-dicyclohexyl urea is filtered off under suction, washed with tetrahydrofuran and the filtrate is concentrated. The crude product is purified by column chromatography analogously to Example 14 whereupon the oily N-(4-methyl-2-pyridyl)-oleamide is obtained, $n_D^{25}$: 1.5155.

EXAMPLE 19

3.08 g. (0.01 mol) of oleic acid ethyl ester and 1.28 g. (0.01 mol) of 2-amino-5-chloropyridine are heated for 2 hours at 200° under a stream of nitrogen while stirring vigorously. After cooling, the crude product is purified by column chromatography analogously to Example 14. The product is identical with the N-(5-chloro-2-pyridyl)-oleamide produced according to Example 14, M.P. 43°.

EXAMPLE 20

(a) A solution of 8.24 g. (0.04 mol) of N,N'-dicyclohexyl carbodiimide in 50 ml. of tetrahydrofuran is added dropwise at —10° stirring to a solution of 11.2 g. (0.04 mol) of oleic acid and 5.6 g. (0.04 mol) of p-nitrophenol in 100 ml. of tetrahydrofuran. After stirring for 1 hour at —10° and 4 hours at room temperature, the precipitated N,N'-dicyclohexyl urea is filtered off under suction, washed with tetrahydrofuran and concentrated. The oleic acid-p-nitrophenyl ester obtained melts at 37°.

(b) 4.01 g. (0.01 mol) of oleic acid-p-nitrophenyl ester and 108 g. (0.1 mol) of 6-amino-3-picoline are left to stand in 50 ml. of chloroform for 4 days. After evaporation of the solvent, the crude product is purified by column chromatography analogously to Example 14. The product is identical with the N-(5-methyl-2-pyridyl)-oleamide produced according to Example 14.

EXAMPLE 21

5.4 g. (0.05 mol) of 6-amino-3-picoline are dissolved in 100 ml. of dimethyl formamide and 5.05 g. (0.05 mol) of triethylamine. While stirring and cooling with ice water, 5.43 g. (0.05 mol) of trimethylsilyl chloride dissolved in 30 ml. of dimethyl formamide are added dropwise within 10 minutes, and the mixture is stirred for another 2 hours at room temperature. While stirring and cooling with ice water, 5.55 g. (0.055 mol) of triethylamine and then 15.0 g. (0.05 mol) of oleoyl chloride, dissolved in 30 ml. of dimethyl formamide, are added dropwise to the solution of 6-trimethylsilylamino-3-picoline so obtained and the mixture is stirred for another 2 hours. The reaction mixture is poured onto 800 ml. of ice water, the oil which separates is removed and dried under high vacuum (4 hours at 40°). The oil is then dissolved in 100 ml. of petroleum ether and chromatographed on 300 g. of aluminium oxide (Activity Grade III, according to Brockmann). The fractions eluted with petroleum ether/benzene and benzene are tested by thin layer chromatography (according to Stahl, Silicagel G, solvent chloroform/methanol 20:1, development: phosphorus molybdic acid 20% in ethanol). The fractions containing pure N-(5-methyl-2-pyridyl)-oleamide are combined and concentrated (cf. Example 14).

EXAMPLE 22

1.62 g. (0.01 mol) of 1,1'-carbonyl-diimidazole are added at room temperature to 2.82 g. (0.01 mol) of oleic acid dissolved in 25 ml. of anhydrous tetrahydrofuran.

On completion of the carbon dioxide development, 1.29 g. (0.01 mol) of 2-amino-5-chloropyridine dissolved in 20 ml. of anhydrous tetrahydrofuran are added to the solution formed of 1-oleoyl imidazole and the reaction mixture is refluxed for 10 minutes. The residue obtained after evaporation of the tetrahydrofuran is taken up in 50 ml. of ether and extracted three times with 50 ml. of water each time. The ethereal solution is concentrated and the N-(5-chloro-2-pyridyl)-oleamide is purified by column chromatography analogously to Example 14, M.P. 40°.

EXAMPLE 23

2.81 g. (0.01 mol) of oleamide and 1.75 g. (0.01 mol) of 2-amino-5-bromopyridine are heated, while stirring in a stream of nitrogen, for 2 hours at 220°. After cooling, the N-(5-bromo-2-pyridyl)-oleamide is purified by column chromatography analogously to Example 14, M.P. 48°.

EXAMPLE 24

(a) 1.28 g. (0.01 mol) of 2 - amino - 5 - chloropyridine and 1.1 g. (0.011 mol) of triethylamine are dissolved in 50 ml. of chloroform. While stirring and cooling with ice water, 6.18 g. (0.01 mol) of 9,10-dibromo-octadecanoyl chloride dissolved in 35 ml. of chloroform, are added dropwise within 10 minutes and the mixture is stirred for another 2 hours at room temperature. The chloroform solution is washed with water three times and evaporated to dryness and the N - (5 - chloro - 2-pyridyl)-9,10-dibromo - octadecanamide is recrystallised from methanol, M.P. 72°.

(b) 0.690 g. (0.001 mol) of N - (5 - chloro-2-pyridyl)-9,10 - dibromo - octadecanamide are dissolved in 5 ml. of anhydrous ethanol. 0.9 g. of activated zinc dust are added under an atmosphere of nitrogen and the mixture is refluxed for 1 hour. After cooling, the zinc is removed by filtration and washed with 100 ml. of ether free from peroxide. The filtrate is extracted 4 times with 100 ml. of water each time, the organic phase is dried over sodium sulphate, concentrated and the N - (5 - chloro-2-pyridyl)-oleamide is recrystallised from methanol, M.P. 44°.

EXAMPLE 25

3.93 g. (0.01 mol) of N - (5 - chloro - 2-pyridyl)-oleamide are dissolved in 30 ml. of chloroform. While stirring and cooling with a solution of ice and sodium chloride, 1.6 g. (0.01 mol) of bromine are added dropwise within 1 hour and the mixture is stirred for another 2 hours at room temperature. The chloroform solution is concentrated to dryness (at 30°) and the N - (5 - chloro-2 - pyridyl) - 9,10 - dibromo-octadecanamide is recrystallised from methanol, M.P. 72°.

Debromination to form N - (5 - chloro - 2-pyridyl) - oleamide is performed according to Example 24(b).

EXAMPLE 26

3.75 g. (0.01 mol) of N - (6 - amino - 3-pyridyl)-octadecanamide are left to stand in 20 ml. of pyridine and 10 ml. of acetanhydride for 12 hours at room temperature. The reaction product is poured onto 150 g. of ice and the precipitated crystals of N - (5 - acetamido - 2-pyridyl) - octadecanamide are filtered off under suction and recrystallised from methanol, M.P. 161°.

EXAMPLE 27

N-(5-chloro-2-pyridyl)-linolamide 2.57 g. (0.02 mol) of 2 - amino - 5 - chloropyridine and 2.22 g. (0.022 mol) of triethylamine are dissolved in 100 ml. of benzene. 6 g. (0.02 mol) of linoleyl chloride (9,12-octadienoyl chloride), dissolved in 30 ml. of benzene, are added dropwise within 10 minutes while stirring and cooling with ice water and the mixture is stirred for another 2 hours at room temperature. Precipitated triethylamine hydrochloride is separated by suction filtration and washed with hot benzene; the washing is combined with the filtrate.

To the filtrate which contains the desired N - (5 - chloro - 2 - pyridyl) - linolamide, there are added as stabilizer 4 mg. of dodecyl gallate and 4 mg. of [D,L]-α-tocopherol, benzene is then evaporated from the filtrate; the resulting oily crude product (7.8 g.) is dissolved in low boiling petroleum ether (40–60°) and chromatographed on alumina (activity III, according to Brockmann).

The alumina is eluted successively with petroleum ether (40–60°), petroleum ether/benzene and with benzene and the resulting fractions are tested by thin-layer chromatography (according to Stahl, Silicagel G. solvent; acetone/hexane 1:4, developmemnt: phosphomolybdic acid 20% in alcohol), for the presence of N - (5 - chloro - 2-pyridyl)-linolamide ($R_f$ value: 0.7).

The fractions containing pure N-(5-chloro-2-pyridyl)-linolamide are combined and concentrated to an oil which slowly crystallizes at 20°. The crystals have a melting point of 28°.

Fractions containing the impure product are combined, concentrated, and again chromatographed (Alox III, 150 g.).

The fractions containing pure N-(5-chloro-2-pyridyl)-linolamide which result from this second chromatography are identified as described above, combined and concentrated.

The following compounds are obtained in an analogous manner from the corresponding starting materials:

| | M.P., degrees |
|---|---|
| N-(6-fluoro-3-pyridyl)-linolamide | 30 |
| N-(5-iodo-2-pyridyl)-linolamide | 51 |
| N-(3,5-dibromo-2-pyridyl)-linolamide | 72 |
| N-(6-chloro-3-pyridyl)-linolamide | 48 |
| N-(6-methyl-3-pyridyl)-linolamide | 23 |
| N-(6-acetylamino-3-pyridyl)-linolamide | 128 |

The production of N - (6 - acetylamino - 3-pyridyl)-linolamide is performed in tetrahydrofuran. The product is recrystallized from methanol.

EXAMPLE 28

N-(5-methyl-2-pyridyl)-linolamide 4.32 g. (0.04 mol) of 2 - amino - 5 - methylpyridine are dissolved in 100 ml. of benzene. 6.0 g. (0.02 mol) of linoleyl chloride in 30 ml. of benzene are added dropwise within 10 minutes while stirring and cooling (ice water) and the mixture is stirred for another 2 hours at room temperature. Precipitated 2 - amino - 5 - methylpyridine hydrochloride is filtered off under suction and washed with hot benzene. The washings are combined with the filtrate which contains the desired product.

After addition of a stabilizer analogously to Example 27 the filtrate is evaporated in vacuo and to the resulting crude product there are added 50 g. of urea, dissolved in 150 ml. of hot methanol. The precipitated crystals of the urea adduct thus formed are filtered off under suction 12 hous later, washed with 10 ml. of cold ether and recrystalized from methanol. They are composed of 3 parts by weight of urea and 1.1 part by weight of N - (5 - methyl-2 - pyridyl) - linolamide. In order to decompose this complex, 10 g. of the urea adduct are added to 100 ml. of water. The resulting oil N - (5 - methyl - 2-pyridyl)-linolamide, is extracted with petroleum ether. After evaporating the solvent in vacuo, there is obtained the purified N-(5-methyl-2-pyridyl)-linolamide, M.P. 16°.

The crude N-(5-methyl-2-pyridyl)-linolamide can also be purified by centrifugal molecular distillation.

In an analogous manner are obtained:

N-(4,6-dimethyl-2-pyridyl)-linolamide $n_D^{28°}$: 1.5154
N-(6-methoxy-3-pyridyl)-linolamide, M.P. 28°
N-(2-chloro 3-pyridyl)-linolamide, $n_D^{25°}$: 1.5222 via the respective urea adducts, the weight ratio of urea to the respective linolamide being in each case about 3:1.

EXAMPLE 29

N-(5-amino-2-pyridyl)-linolamide 4.02 g. (0.01 mol) of N-(5-nitro-2-pyridyl)-linolamide are dissolved in a mixture of 30 ml. of water, 6 ml. of dioxan and 6 ml. of methanol. 10 g. of iron powder are added and the mixture is stirred for 30 minutes at 90–93° under an atmosphere of nitrogen. The reaction mixture is filtered hot and the filtrate is evaporated to dryness. The N - (5-amino-2-pyridyl) - linolamide is purified by chromatography on an alumina column analogously to Example 27 and it is recrystallized from hexane, M.P. 42°; hydrochloride, M.P. 87°.

EXAMPLE 30

N-(5-sulfo-2-pyridyl)-linolamide (a) 6.0 g. (0.02 mol) of linoleyl chloride and 3.48 g. (0.02 mol) of 2-aminopyridine-5-sulfonic acid are heated in a stream of nitrogen for 3 hours at 160°. After cooling, the reaction mixture is extracted with boiling benzene, the reaction product which remains is washed with water and recrystallized from methanol/water. M.P. >260° (decomposition).

EXAMPLE 31

N-(6-methyl-2-pyridyl)-linolamide 8.4 g. (0.03 mol) of linoleic acid and 3.03 g. (0.03 mol) of triethylamine are dissolved in 100 ml. of tetrahydrofuran and the solution is cooled to −15°. 3.23 g. (0.03 mol) of ethylchloroformate dissolved in 20 ml. of tetrahydrofuran, are added dropwise while stirring and taking care that the temperature does not rise above −10°. After stirring for 15 minutes at −10°, a solution of 3.24 g. of 2-amino-6-methylpyridine in 20 ml. of tetrahydrofuran is added at −8° to −12°. The mixture is stirred for 1 hour at −10° and, after interruption of cooling, for another 12 hours at room temperature. The precipitated triethylamine hydrochloride is filtered off under suction and washed with hot benzene. The crude product is purified by

EXAMPLE 32

N-(4-methyl-2-pyridyl)-linolamide 11.2 g. (0.04 mol) of linoleic acid and 4.32 g. (0.04 mol) of 2-amino-4-methylpyridine are dissolved in 100 ml. of tetrahydrofuran. At —10°, a solution of 8.24 g. (0.04 mol) of N,N'-dicyclohexyl-carbodiimide in 50 ml. of tetrahydrofuran is added dropwise while stirring. After stirring for 1 hour at —10° and 4 hours at room temperature, the precipitated N,N'-dicyclohexyl urea is filtered off under suction, washed with tetrahydrofuran and the solvent is evaporated from the filtrate in vacuo. The crude product is purified by columnar chromatography analogously to Example 27. To the resulting oil, pure N-(4-methyl-2-pyridyl)-linolamide, there is added an equivalent amount of picric acid, and ethanol at 50°. N-(4-methyl-2-pyridyl)-linolamide picrate which crystallizes from the mixture, has a melting point of 85°.

EXAMPLE 33

N-(5-nitro-2-pyridyl)-linolamide 5.56 g. (0.04 mol) of 2-amino-5-nitropyridine are dissolved in 200 ml. of pyridine. 12 g. (0.04 mol) of linoleoyl chloride are added dropwise while stirring and cooling (ice water) and the mixture is stirred for 6 hours at room temperature. The precipitated pyridine hydrochloride is filtered off under suction and the pyridine is removed in vacuo at 45° (11 torr). The residue is purified by columnar chromatography analogously to Example 27, M.P. 38°; it serves as starting material for Example 29.

The following compounds are obtained in an analogous manner from the corresponding starting materials:

N-(5-sulfamyl-2-pyridyl)-linolamide, M.P. 115°
N-(6-hydroxy-2-pyridyl)-linolamide, M.P. 80°
N-(6-propoxy-3-pyridyl)-linolamide, M.P. 41°
N-(6-hexoxy-3-pyridyl)-linolamide, M.P. 34°
N-(5-cyano-2-pyridyl)-linolamide, M.P. 45°
N-(6-butoxy-3-pyridyl)-linolamide, M.P. 31°
N-(6-mercapto-3-pyridyl)-linolamide, M.P. 123°
N-(6-dimethylamino-3-pyridyl)-linolamide, M.P. 43°, hydrochloride M.P. 250° (decomposition)
N-6-ethoxy-3-pyridyl)-linolamide, M.P. 39°
N-(5-bromo-2-pyridyl)-linolamide, M.P. 45°
N-[6-(3',4'-dichloro-phenylamino)-3-pyridyl]-linolamide, M.P. 100°
N-(5-ethyl-2-pyridyl)-linolamide, $n_D^{28°}$:1.5169
N-(6-methylmercapto-3-pyridyl)-linolamide, M.P. 48°
N-(6-butylmercapto-3-pyridyl)-linolamide, M.P. 25°
N-(6-allylmercapto-3-pyridyl)-linolamide, M.P. 30°
N-(5-diethylcarbamyl-2-pyridyl)-linolamide, M.P. 25°
N-(5-methyl-2-pyridyl)-N-propyl-linolamide $n_D^{28°}$: 1.5234
N-(5-acetyl-2-pyridyl)-linolamide, M.P. 60°
N-(5-ethoxycarbonyl-2-pyridyl)-linolamide, M.P. 34°

EXAMPLE 34

N-(5-methyl-2-pyridyl)-linolenamide 4.32 g. (0.04 mol) of 2-amino-5-methylpyridine are dissolved in 100 ml. of benzene. 6 g. (0.02 mol) of linolenoyl chloride dissolved in 30 ml. of benzene are added dropwise, the addition being made while stirring and cooling (ice water) in a stream of nitrogen. After stirring for 2 hours at room temperature, the reaction product is worked up and purified analogously to Example 28. M.P. 31°.

The following compounds are obtained in an analogous manner from the corresponding starting materials:

N-(6-methoxy-3-pyridyl)-linolenamide, M.P. 28°
N-(4,6-dimethyl-2-pyridyl)-linolenamide, $n_D^{28°}$ 1.5240

EXAMPLE 35

N-(5-chloro-2-pyridyl)-linolenamide 2.57 g. (0.02 mol) of 2-amino-5-chloropyridine and 2.22 g. (0.22) mole of triethylamine are dissolved in 100 ml. of benzene. 6 g. (0.02 mol) of linolenoyl chloride in 30 ml. of benzene are added dropwise within 10 minutes, the addition being made while stirring and cooling (ice water) in an atmosphere of nitrogen, after which the mixture is stirred for 2 hours at room temperature. The reaction product is worked up and purified analogously to Example 27, $n_D^{28°}$ 1.5251.

The following compounds can be produced in an analogous manner from the corresponding starting materials:

N-(6-chloro-3-pyridyl)-linolenamide, M.P. 39°
N-(5-bromo-2-pyridyl)-linolenamide, M.P. 42°
N-(5-iodo-2-pyridyl)-linolenamide, M.P. 52°
N-(6-methyl-2-pyridyl)-linolenamide, $n_D^{28°}$ 1.5236
N-(6-methyl-3-pyridyl)-linolenamide, M.P. 28°
N-(6-fluoro-3-pyridyl)-linolenamide, M.P. 28°
N-(5-methyl-2-pyridyl)-arachidonamide, $n_D^{28°}$: 1.5310 the latter, e.g. from 5,8,11,14-eicosatetraenoyl chloride in lieu of linolenoyl chloride, and from 2-amino-5-methyl-pyridine.

EXAMPLE 36

N-(5-nitro-2-pyridyl)-linolenamide 5.56 g. (0.04 mol) of 2-amino-5-nitropyridine are dissolved in 200 ml. of pyridine. 12 g. (0.04 mol) of linolenoyl chloride are added dropwise in a stream of nitrogen while stirring and cooling (ice water) and then the reaction mixture is stirred for 6 hours at room temperature. It is worked up analogously to Example 33 and N-(5-nitro-2-pyridyl)-linolenamide is isolated. M.P. 42°; it serves as starting material for Example 41.

The following compounds are obtained in an analogous way from the corresponding starting materials:

N-(5-cyano-2-pyridyl)-linolenamide, M.P. 40°
N-(6-ethoxy-3-pyridyl)-linolenamide, M.P. 42°
N-[6-(3',4'-dichlorophenylamino)-3-pyridyl]-linolenamide, M.P. 108°
N-(6-allyloxy-3-pyridyl)-linolenamide, M.P. 37°
N-(6-propoxy-3-pyridyl)-linolenamide, M.P. 38°
N-(6-hexoxy-3-pyridyl)-linolenamide, M.P. 30°
N-(6-butoxy-3-pyridyl)-linolenamide, M.P. 36°
N-(5-ethyl-2-pyridyl)-linolenamide, $n_D^{28°}$, 1.5258.

EXAMPLE 37

N-(5-methyl-2-pyridyl)-linolamide (a) A solution of 8.24 g. (0.04 mol) of N,N'-dicyclohexyl carbodiimide in 50 ml. of tetrahydrofuran is added dropwise at —10° to a solution of 11.2 g. (0.04 mol) of linoleic acid and 5.6 g. (0.04 mol) of p-nitrophenol in 100 ml. of tetrahydrofuran while stirring. After stirring for 1 hour at —10° and for 4 hours at room temperature, the precipitated N,N' - dicyclohexyl urea is filtered off under suction and washed with tetrahydrofuan and evaporated in vacuo. The linoleic acid-p-nitrophenyl ester obtained melts at 28°.

(b) 4.01 g. (0.01 mol) of linoleic acid-p-nitrophenyl ester and 10.8 (0.1 mol) of 2-amino-5-methylpyridine are left to stand in 50 ml. of chloroform for 4 days. After evaporating off the solvent, the crude product is purified by columnar chromatography analogously to Example 27. The product is identical with the N-(5-methyl-2-pyridyl)-linolamide produced according to Example 28.

EXAMPLE 38

N-(5-methyl-2-pyridyl)-7,9-octadecadienamide 6.0 g. (0.02 mol) of octadeca-7,9-dienoyl chloride are reacted with 4.32 g. (0.04 mol) of 2-amino-5-methylpyridine analogously to Example 28, M.P. 32°.

The octadeca-7,9-dienoyl chloride used is produced by columnar chromatography analogously to Example 27, $n_D^{28°}$ 1.5150.

debromination of the oleic acid, dehydrobromination of the addition product and conversion into the acid chloride by means of oxalyl chloride.

N - (5 - chloro-2-pyridyl)-7,9-octadecadienamide, M.P. 55°, is produced in an analogous way.

EXAMPLE 39

N-(4-methyl-2-pyridyl)-linolamide 3.08 g. (0.01 mol) of linoleic acid ethyl ester and 1.08 g. (0.01 mol) of 2-amino-4-methylpyridine are heated for 2 hours at 200° in a stream of nitrogen while stirring vigorously. After cooling, the crude product is purified by columnar chromatography analogously to Example 27. The product is identical with N - (4-methyl-2-pyridyl)-linolamide produced according to Example 32.

EXAMPLE 40

N-(5-amino-2-pyridyl)-linolamide 4.01 g. (0.01 mol) of N-(5-nitro-2-pyridyl)-linolamide (for production see Example 33) are dissolved in 150 ml. of purified ethanol, 1.5 g. of Pd—$CaCO_3$ catalyst are added and the whole is hydrogenated at room temperature and normal pressure until 0.03 mol of hydrogen have been taken up (duration about 30 hours). The solution of the reaction product, after removal of the catalyst, is evaporated and the residue is recrystallized from methanol, M.P. 42°.

To prepare the hydrochloride of N-(5-amino-2-pyridyl)-linolamide the base is dissolved in ethanol and an ethereal solution of hydrochloric acid is added at 0°. The precipitate is filtered off and recrystallized from ethanol-ether, M.P. 87°.

EXAMPLE 41

N-(5-amino-2-pyridyl)-linolenamide 4.01 g. (0.01 mol) of N-(5-nitro-2-pyridyl)-linolenamide (for production see Example 36) are dissolved in 150 ml. of distilled purified ethanol, 1.5 g. of Pd—$CaCO_3$ are added and the whole is hydrogenated for 30 hours at room temperature and normal pressure. The reaction solution, after removal of the catalyst is evaporated in vacuo and the residue is recrystallized from methanol, M.P. 38°.

EXAMPLE 42

N-(5-bromo-2-pyridyl)-linolamide 2.22 g. (0.022 mol) of triethylamine are dissolved in 50 ml. of anhydrous ether. While stirring and cooling with ice water, 3 g. (0.01 mol) of linoleoyl chloride dissolved in 20 ml. of anhydrous ether are added dropwise within 5 minutes. Then 1.73 g. (0.01 mol) of 2-amino-5-bromo-pyridine dissolved in 50 ml. of ethyl acetate are added dropwise within 10 minutes and the mixture is stirred for another 2 hours.

The precipitated triethylamine hydrochloride is filtered off under suction and washed with hot benzene. N-(5-bromo-2-pyridyl)-linolamide is obtained from the filtrate analogously to Example 27 by chromatography on an alumina column, M.P. 45°.

EXAMPLE 43

N-(5-bromo-2-pyridyl)-linolamide 2.79 g. (0.01 mol) of linolamide and 1.75 g. (0.01 mol) of 2-amino-bromo-pyridine are heated for 2 hours at 220° while stirring in a stream of nitrogen. After cooling, the N-(5-bromo-2-pyridyl)-linolamide is purified by chromatography on an alumina column analogously to Example 27, M.P. 45°.

EXAMPLE 44

N-(5-carbamyl-2-pyridyl-linolamide 6.85 g. (0.05 mol) of 6-amino-nicotine amide are dissolved in 100 ml. of dimethyl formamide and 5.05 g. (0.05 mol) of triethylamine. While stirring and cooling with ice water, 5.43 g. (0.05 mol) of trimethyl silyl chloride, dissolved in 30 ml. of dimethyl formamide are added dropwise within 10 minutes and the mixture is stirred for another 2 hours at room temperature. While stirring and cooling with ice water, 5.55 g. (0.055 mol) of triethylamine and then 15.0 g. (0.05 mol) of linoleoyl chloride, dissolved in 30 ml. of dimethyl formamide, are added dropwise and the mixture is stirred for another 2 hours. The reaction mixture is poured into 800 ml. of ice water, the precipitated product is filtered off under suction and dried under high vacuum (4 hours at 40°, about 1 torr). The oil is then dissolved in 100 ml. of chloroform and the solution is chromatographed on 300 g. of alumina (activity III, according to Brockmann). The fractions eluted with chloroform, chloroform/methanol and methanol are tested by thin layer chromatography (according to Stahl, Silicagel G, solvent chloroform/methanol 20:1, development: phosphorus molybdic acid 20% in ethanol). The fractions containing pure N-(5-carbamyl-2-pyridyl)-linolamide are combined, evaporated in vacuo and the residue recrystallized from methanol/ether, M.P. 142°.

EXAMPLE 45

N-(5-methyl-2-pyridyl)-linolamide 1.62 g. of 1,1'-carbonyl diimidazole are added at room temperature to 2.80 g. (0.01 mol) of linoleic acid dissolved in 25 ml. of anhydrous tetrahydrofuran.

On completion of the carbon dioxide development, 1.06 g. (0.01 mol) of 2-amino-5-methyl-pyridine dissolved in 20 ml. of anhydrous tetrahydrofuran are added and the reaction mixture is refluxed for 10 minutes. The residue obtained on evaporating the tetrahydrofuran off in vacuo is taken up in 50 ml. of ether and extracted with 50 ml. of water. The ethereal solution is concentrated and the N-(5-methyl-2-pyridyl- linolamide is concentrated and the N-(5-methyl-2-pyridyl)-linolamide is purified by chromatography on an alumina column analogously to Example 27, M.P. 16°.

EXAMPLE 46

N-(6-methyl-3-pyridyl)-linolamide 1.48 g. (0.01 mol) of 6-methyl-nicotine azide and 2.8 g. (0.01 mol) of linoleic acid are dissolved in 10 ml. of xylene and the solution is heated until nitrogen and carbon dioxide are developed. The heat is quickly removed and, as soon as the violent carbon dioxide development has subsided, the reaction mixture is refluxed.

On evaporating off the solvent, the N-(6-methyl-3-pyridyl)-linolamide is purified by chromatography on an alumina column analogously to Example 27, M.P. 23°.

EXAMPLE 47

N-(5-acetylamino-2-pyridyl)-linolamide 3.71 g. (0.01 mol) of N-(5-amino-2-pyridyl)-linolamide are left to stand for 12 hours at room temperature in 10 ml. of pyridine and 10 ml. of acetanhydride. The reaction product is poured onto 150 g. of ice and the precipated crystals of N-(5-acetylamino-2-pyridyl)-linolamide are filtered off under suction and recrystallized from methanol, M.P. 125°.

N-[5-(1'-acetoxyethyl)-2-pyridyl]-linolamide can be produced in an analogous manner from N-[5-(1'-hydroxyethyl)-2-pyridyl]-linolamide, $n_D^{28°}$:1.5110.

EXAMPLE 48

N-[5-(1'-hydroxyethyl)-2-pyridyl]-linolamide 0.398 g. (0.001 mol) of N-5-acetyl-2-pyridyl)-linolamide are dissolved in 10 ml. of methanol, 0.056 mg. (0.0015 mol) of sodium boronhydride are added at room temperature and the solution is left to stand for 2 hours. The reaction solution is concentrated to 3 ml. under reduced pressure and poured onto 30 g. of ice. The precipitated oil is extracted three times with 50 ml. of ethyl acetate each time, the organic phase is washed with water and, after drying with sodium sulfate, concentrated. The N-[5-(1'-hydroxy-ethyl)-2-pyridyl]-linolamide is purified by chromatography on an alumina column analogously to Example 27, $n_D^{28°}$: 1.5124.

In an analogous manner there are obtained N-[5-(2'-hydroxyethyl)-, N-[5-(1'-hydroxy-pentyl)- and N-[5-(1'-hydroxypropyl)-2-pyridyl]-linolamide.

EXAMPLE 49

N-(5-methyl-2-pyridyl)-linolamide (a) 1.06 g. (0.01 mol) of 2-amino-5-methyl pyridine and 1.1 g. (0.011 mol) of triethylamine are dissolved in 50 ml. of chloroform. 6.18 g. (0.01 mol) of 9,10,12,13-tetrabromo-stearic acid dissolved in 35 ml. of chloroform are added dropwise within 10 minutes while stirring and cooling with ice water and the mixture is stirred for another 2 hours at room temperature. The chloroform solution is washed three times with water and evaporated to dryness and the N-(5-methyl-2-pyridyl-9,10,12,13-tetrabromo-stearic amide is recrystallized from ether/methanol, M.P. 102°.

(b) 0.690 g. (0.001 mol) of N-(5-methyl-2-pyridyl)-9,10,12,13-tetrabromo-stearic amide are dissolved in 5 ml. of anhydrous ethanol, 0.9 g. of activated zinc dust is added under an atmosphere of nitrogen and the mixture is refluxed for 1 hour. After cooling, the zinc is removed by filtration, the solution is evaporated to dryness and the N-(5-methyl-2-pyridyl)-linolamide is purified by chromatography on an alumina column analogously to Example 27, M.P. 16°.

EXAMPLE 50

(a) 15 ml. of 1-N ethereal diazomethane solution are added dropwise to a solution of 4.0 g. (0.01 mol) of N-(5-carboxy-2-pyridyl)-linolamide (see Example 50 (b)) in 20 ml. of chloroform. The reaction mixture is left to stand for 2 hours at 23° then concentrated in a vacuo at 43° under 12.5 torr and the N-(5-methoxy-carbonyl-2-pyridyl)-linolamide which remains is recrystallised from methanol, M.P. 61°. In an analogous manner N-(5-methoxycarbonyl-2-pyridyl)-oleamide is obtained, M.P. 67°.

The following N-(ethoxycarbonyl-pyridyl)-amides can be produced by the method described above when using the equimolar amount of diazoethane:

N-(5-ethoxycarbonyl-2-pyridyl)-linolamide, M.P. 39°
N-(5-ethoxycarbonyl-2-pyridyl)-undecenamide, M.P. 74°
N-(5-ethoxycarbonyl-2-pyridyl)-tetradecanamide, M.P. 79°
N-(5-ethoxycarbonyl-2-pyridyl)-N-methyl-linolamide,
N-(5-ethoxycarbonyl-2-pyridyl)-octadecanamide, M.P. 85°
N-(5-ethoxycarbonyl-2-pyridyl)-3,5,5-trimethyl-hexanamide, M.P. 82°
N-(5-ethoxycarbonyl-2-pyridyl)-sorbamide, M.P. 162°
N-(5-ethoxycarbonyl-2-pyridyl)-docosanamide (b) The N-(5-carboxy-2-pyridyl)-linolamide used as starting material is produced, e.g., as follows:

5.3 g. (0.01 mol) of crude N-[5-(2,2,2-trichloroethoxycarbonyl)-2-pyridyl]-linolamide (see Example 50(c)) are dissolved in 30 ml. of glacial acetic acid and 2 ml. of water and the solution is stirred with 5 g. of zinc dust for 12 hours under an atmosphere of nitrogen at 24°. The reaction mixture is diluted with 150 ml. of chloroform, the zinc is removed by filtration, the filtrate is washed three times with 100 ml. of water each time, then dried with 10 g. of anhydrous sodium sulphate and concentrated in vacuo at 45°/11 torr. The N-(5-carboxy-2-pyridyl)-linolamide which remains is recrystallised from methanol, M.P. 179°. It decomposes at over 165°.

The following acids, for example, are obtained in an analogous manner and are used without purification as crude starting material:

N-(5-carboxy-2-pyridyl)-octadecanamide
N-(5-carboxy-2-pyridyl)-oleamide
N-(5-carboxy-2-pyridyl)-10-undecanamide
N-(5-carboxy-2-pyridyl)-tetradecanamide
N-(5-carboxy-2-pyridyl)-sorbamide
N-(5-carboxy-2-pyridyl)-N-methyl-linolamide
N-(5-carboxy-2-pyridyl)-3,5,5-trimethyl-hexanamide
N-(5-carboxy-2-pyridyl)-docosanamide (c) The trichloroethyl ester used as starting material (see Example 50(b)) is produced, e.g., as follows:

1.41 g. (0.01 mol) of 6-amino-nicotinic acid are dissolved in a mixture of 15 ml. of 2,2,2-trichloroethanol and 3 ml. of concentrated sulphuric acid and the solution is stirred for 1 hour at 140°. After cooling, the precipitated sulphate of 6-amino-nicotinic acid-2,2,2-trichloroethyl ester is filtered off and added to 10 ml. of 0° cold concentrated sodium hydroxide solution. The alkaline solution is extracted three times with 100 ml. of chloroform each time. The combined chloroform solutions are washed neutral with water, dried over sodium sulphate and concentrated in vacuo at 40°/11 torr. The 6-amino-nicotinic acid-2,2,2-trichloroethyl ester which remains is recrystallised from acetone/hexane, M.P. 99°.

2.69 g. (0.01 mol) of 6-amino-nicotinic acid-2,2,2-trichoroethyl ester are dissolved in 20 ml. of pyridine. While stirring and cooling (ice water) 3 g. (0.01 mol) of linoleoyl chloride are added dropwise and the mixture is stirred for 6 hours at room temperature. The precipitated pyridine hydrochloride is filtered off under suction and the pyridine is evaporated off in vacuo at 45°/11 torr, whereupon N-[5-(2,2,2-trichloroethoxycarbonyl)-2-pyridyl]-linolamide remains.

The following compounds are produced analogously:

N-[5-(2,2,2-trichloroethoxycarbonyl)-2-pyridyl]-oleamide,
N-[5-(2,2,2-trichloroethoxycarbonyl)-2-pyridyl]-10-undecanamide
N-[5-(2,2,2-trichloroethoxycarbonyl)-2-pyridyl]-tetradecanamide
N-[5-(2,2,2-trichloroethoxycarbonyl)-2-pyridyl]-N-methyllinolamide
N-[5-(2,2,2-trichloroethoxycarbonyl)-2-pyridyl]-octadecanamide
N-[5-(2,2,2-trichloroethoxycarbonyl)-2-pyridyl]-3,5,5-trimethylhexanamide
N-[5-(2,2,2-trichloroethoxycarbonyl)-2-pyridyl]-sorbamide
N-[5-(2,2,2-trichloroethoxycarbonyl)-2-pyridyl]-docosanamide

EXAMPLE 51

4.0 g. (0.01 mol) of N-(5-carboxy-2-pyridyl)-linolamide (for production of Example 50(b)) and 0.5 ml. (0.01 mol) of ethanol are dissolved in 50 ml. chloroform. At —10° while stirring, a solution of 2.06 g. (0.01 mol) of N,N'-dicyclohexyl-carbodiimide in 20 ml. of chloroform is added dropwise. After stirring for 1 hour at —10° and for 4 hours at room temperature, the precipitated N,N'-dicyclohexyl urea is filtered off under suction, washed with chloroform and the filtrate is evaporated in a rotary evaporator at 45°/11 torr. The residue, N-(5-ethoxycarbonyl-2-pyridyl)-linolamide, is recrystallised from methanol, M.P. 39°.

EXAMPLE 52

0.4 g. (0.001 mol) of N-(5-carboxy-2-pyridyl)-linolamide are dissolved in 20 ml. of chloroform. At —5° while stirring, a solution of 0.26 g. (0.002 mols) of oxalyl chloride in 5 ml. of chloroform is added dropwise. After stirring for 1 hour at 0° and for 8 hours at room temperature, the solution is evaporated on a rotary evaporator at 20°/11 torr. The last traces of excess oxalyl chloride are removed by taking it up three times in 30 ml. of chloroform each time and evaporating the solvent.

The residue is dissolved in 20 ml. of chloroform. At 0°, a solution of 3 ml. pyridine and 2 ml. of ethanol is added dropwise. After stirring for 1 hour at room temperature, the reaction mixture is diluted with 50 ml. of chloroform and washed 3 times with 30 ml. of water each time. The chloroform solution is evaporated in a rotary evaporator at 40°/11 torr. and the N-(5-ethoxycarbonyl-2-pyridyl)-linolamide is recrystallised from ethanol, M.P. 39°.

EXAMPLE 53

1.62 g. (0.01 mol) of carbonyl-1,1'-diimidazole are added to a solution of 4.0 g. (0.01 mol) of N-(5-carboxy-2-pyridyl)-linolamide in 50 ml. of chloroform, the addition being made at room temperature. On completion of the development of carbon dioxide, 0.5 ml. (0.011 mol) of ethanol are added and the reaction mixture is refluxed for 10 minutes.

After cooling, the reaction mixture is diluted with 100 ml. of chloroform and extracted three times with 50 ml. water each time. The chloroform solution is evaporated and the N-(5-ethoxycarbonyl-2-pyridyl)-linolamide is recrystallised from methanol, M.P. 39°.

EXAMPLE 54

The following compounds can also be produced analogously to the processes described in Examples 51, 52 and 53:

N-(5-methoxycarbonyl-2-pyridyl)-oleamide, M.P. 67°
N-(5-methoxycarbonyl-2-pyridyl)-linolamide, M.P. 61°
N-(5-ethoxycarbonyl-2-pyridyl)-undecenamide, M.P. 74°
N-(5-ethoxycarbonyl - 2 - pyridyl)-tetradecanamide, M.P. 79°
N-(5-ethoxycarbonyl - 2 - pyridyl)-N-methyl-linolamide
N-ethoxycarbonyl-2-pyridyl)-octadecanamide, M.P. 85°
N-(5-ethoxycarbonyl - 2 - pyridyl) - 3,5,5 - trimethyl-hexamide, M.P. 82°
N-(5-ethoxycarbonyl-2-pyridyl - sorbamide, M.P. 162°
N-(5 - ethoxycarbonyl - 2 - pyridyl) - docasanamide, and
N-(5-isopropoxycarbonyl-2 - pyridyl - linolamide, $n_D^{23°}$; 1.5170

What is claimed is:

1. A compound selected from the group consisting of compounds of the formulae

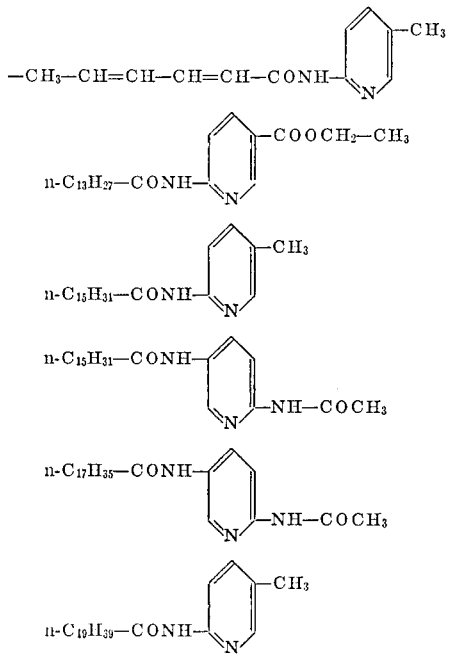

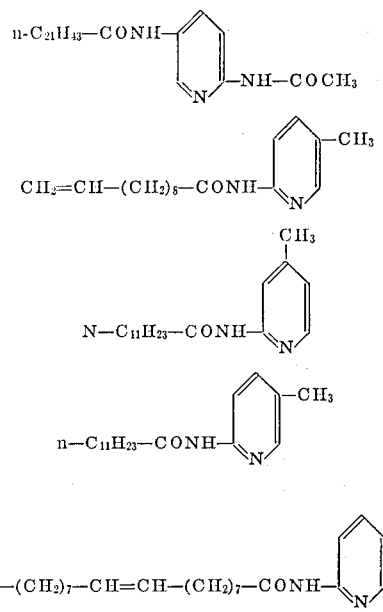

2. A compound according to claim 1 of the formula

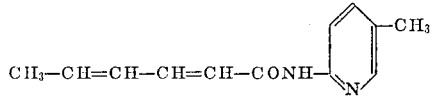

3. A compound according to claim 1 of the formula

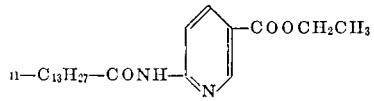

4. A compound according to claim 1 of the formula

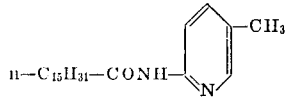

5. A compound according to claim 1 of the formula

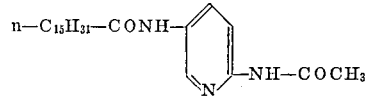

6. A compound according to claim 1 of the formula

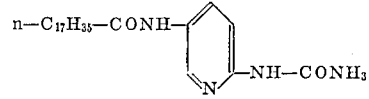

7. A compound according to claim 1 of the formula

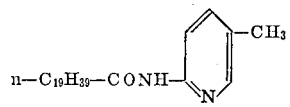

8. A compound according to claim 1 of the formula

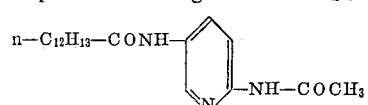

9. A compound according to claim 1 of the formula

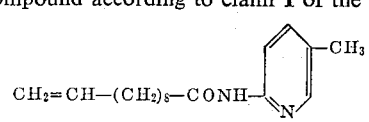

10. A compound according to claim 1 of the formula
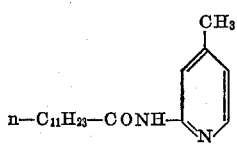
11. A compound according to claim 1 of the formula
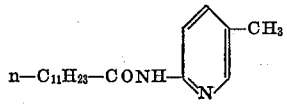
12. A compound according to claim 1 of the formula
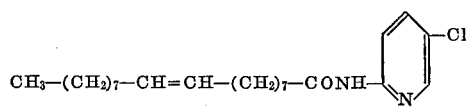
References Cited
FOREIGN PATENTS
| | | | |
|---|---|---|---|
| 1,070,816 | 6/1967 | Great Britain | 260—295 |
| 1,442,839 | 5/1966 | France | 260—295 |
| 1,510,320 | 12/1967 | France | 260—295 |
| 1,510,321 | 12/1967 | France | 260—295 |
ALAN L. ROTMAN, Primary Examiner
U.S. Cl. X.R.
260—294.8, 294.9, 295.5; 424—266